United States Patent [19]
Honey et al.

[11] Patent Number: 6,154,250
[45] Date of Patent: Nov. 28, 2000

[54] SYSTEM FOR ENHANCING THE TELEVISION PRESENTATION OF AN OBJECT AT A SPORTING EVENT

[75] Inventors: Stanley K. Honey, Palo Alto; Richard H. Cavallaro, Mountain View; David Blyth Hill, Los Angeles; Andrew G. Setos, Pacific Palisades, all of Calif.; Jerry Neil Gepner, Langhorn, Pa.; Timothy Paul Heidmann, Los Altos, Calif.; Patrick Wade Olsen, Sunnyvale, Calif.; Fred Judson Heinzmann, Los Altos, Calif.; Alan C. Phillips, Los Altos, Calif.; Harold Guthart, Los Altos, Calif.; Alan Alexander Burns, Portola Valley, Calif.; Charles Lawrence Rino, Menlo Park, Calif.; Philip Calvin Evans, Portola Valley, Calif.

[73] Assignee: Fox Sports Productions, Inc., Los Angeles, Calif.

[21] Appl. No.: 09/208,903

[22] Filed: Dec. 10, 1998

Related U.S. Application Data

[63] Continuation of application No. 08/585,145, Jan. 10, 1996, Pat. No. 5,912,700.

[51] Int. Cl.⁷ ....................................................... H04N 7/18
[52] U.S. Cl. .......................... 348/157; 348/169; 348/478; 348/589; 348/600
[58] Field of Search .............................. 348/61, 157, 169, 348/170, 171, 172, 477, 478, 571, 578, 584, 585, 586, 589, 598, 599, 600

[56] References Cited

U.S. PATENT DOCUMENTS

| | | | |
|---|---|---|---|
| 3,580,993 | 5/1971 | Sandorf et al. | 178/6 |
| 3,840,699 | 10/1974 | Bowerman | 178/6.8 |
| 4,084,184 | 4/1978 | Crain | 358/93 |
| 4,521,196 | 6/1985 | Briard et al. | 434/20 |
| 4,591,897 | 5/1986 | Edelson | 358/22 |
| 4,700,306 | 10/1987 | Wallmander | 364/449 |
| 4,739,406 | 4/1988 | Morton et al. | 358/183 |
| 4,975,770 | 12/1990 | Troxell | 358/96 |
| 4,999,709 | 3/1991 | Yamazaki et al. | 358/160 |
| 5,063,603 | 11/1991 | Burt | 382/37 |
| 5,179,421 | 1/1993 | Parker et al. | 356/152 |

(List continued on next page.)

FOREIGN PATENT DOCUMENTS

| | | |
|---|---|---|
| 2106336 | 9/1993 | Canada . |
| 41 01 156 A1 | 1/1991 | Germany . |
| 4222679 | 1/1994 | Germany . |
| 1659078 A1 | 12/1988 | U.S.S.R. . |
| 2191361 | 12/1987 | United Kingdom . |
| WO 95/10915 | 4/1995 | WIPO . |
| WO 95/10919 | 4/1995 | WIPO . |

OTHER PUBLICATIONS

Replay 2000—The Ultimate Workstation for Sport Commentators and Producers, Orad Hi–Tec Systems, Apr. 1995.
SailTrack, GPS Tracking System for Animated Graphics Broadcast Coverage of the America's Cup Races, 1992.
SailTrack Technical Overview, 1992.
Sail Viz Software Documentation, 1992.
For Hockey Fans The Puck Starts Here, The Time Inc. Magazine Company, Sports Illustrated, p. 14, Oct. 8, 1990.

*Primary Examiner*—Bryan Tung
*Attorney, Agent, or Firm*—Fliesler, Dubb, Meyer & Lovejoy LLP

[57] ABSTRACT

A system for enhancing the television presentation of an object at a sporting event includes one or more sensors which are used to determine the location of the object. Based on the location of the object and the field of view of a broadcast camera, a processor determines the position of the object in a video frame of the broadcast camera. Once knowing where the object is positioned within the video frame, the television signal can be edited or augmented to enhance the presentation of the object.

23 Claims, 19 Drawing Sheets

U.S. PATENT DOCUMENTS

| | | | |
|---|---|---|---|
| 5,264,933 | 11/1993 | Rosser | 348/578 |
| 5,353,392 | 10/1994 | Luquet et al. | 395/135 |
| 5,392,088 | 2/1995 | Abe et al. | 354/402 |
| 5,413,345 | 5/1995 | Nauck | 273/185 R |
| 5,414,439 | 5/1995 | Groves et al. | 345/7 |
| 5,465,144 | 11/1995 | Parker et al. | 356/139.06 |
| 5,469,536 | 11/1995 | Blank | 395/131 |
| 5,479,597 | 12/1995 | Fellous | 395/154 |
| 5,491,517 | 2/1996 | Kreitman et al. | 348/581 |
| 5,508,737 | 4/1996 | Lang | 348/159 |
| 5,513,854 | 5/1996 | Daver | 273/454 |
| 5,543,856 | 8/1996 | Rosser et al. | 348/578 |
| 5,566,251 | 10/1996 | Hanna et al. | 382/284 |
| 5,570,295 | 10/1996 | Isenberg | 364/514 R |
| 5,677,532 | 10/1997 | Duncan et al. | 250/339.15 |
| 5,818,441 | 10/1998 | Throckmorton | 348/13 |

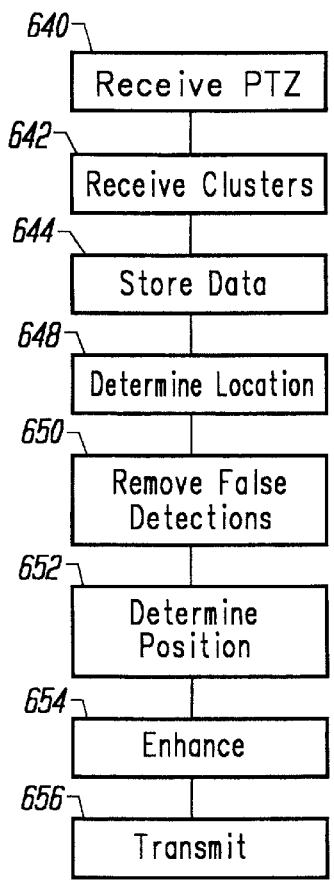
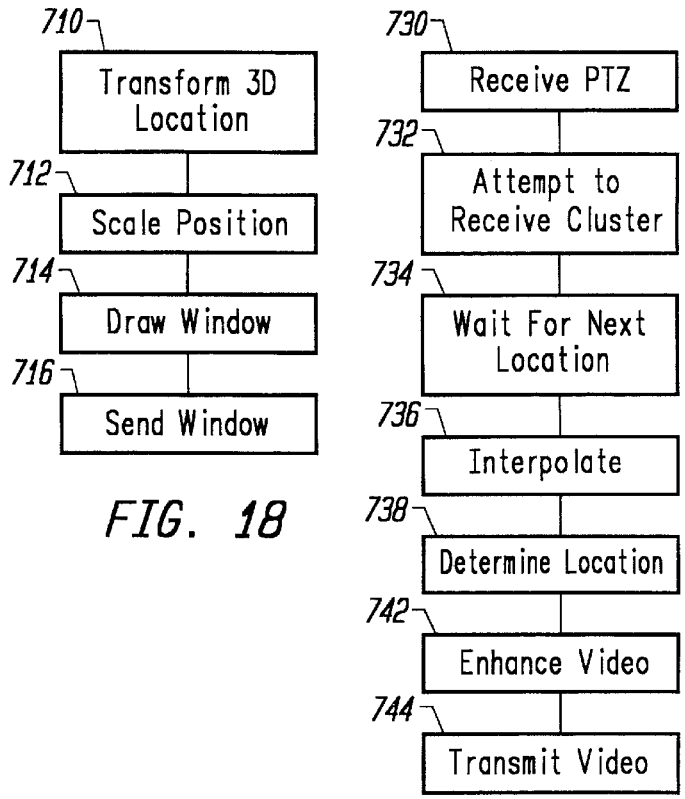
FIG. 16
FIG. 18
FIG. 20
FIG. 21

SYSTEM FOR ENHANCING THE TELEVISION PRESENTATION OF AN OBJECT AT A SPORTING EVENT

This application is a continuation of Ser. No. 08/585,145, filed Jan. 10, 1996, now U.S. Pat. No. 5,912,700.

BACKGROUND OF THE INVENTION

1. Field of the Invention

The present invention is directed to a system for enhancing the television presentation of an object at a sporting event.

2. Description of the Related Art

The television presentation of sporting events needs to be improved. Because of the size and speed of some objects and the distance of the television camera from the playing field, some objects at a sporting event are hard to see on a television screen. One example of an object at a sporting event is the game object, which is defined as the article or thing which is the focus of the game, for example, a hockey puck, baseball, football, soccer ball, shotput, basketball, tennis ball, etc. To compensate for objects that are hard to see on television, broadcasters will use zoom lenses. However, the limited field of view of a zoomed camera prevents the object from being viewed in relation to the playing field and prevents the viewer from seeing other objects that are part of the sporting event. Additionally, even with zoom lenses some objects remain difficult to see on television.

For example, television viewing of a hockey game is hampered by poor visibility and distortion of the hockey puck. The puck is small, and is passed, shot and deflected at high speeds. A standard hockey puck is three inches in diameter and one inch high. A television viewer sees only a limited portion of the ice and the scene being viewed changes rapidly as the camera moves to follow the action. In order to be able to view all areas of the hockey rink, cameras must be located far from the playing surface. Thus, on a standard television screen a hockey puck tends to appear as a small dot or a smear, and sometimes the puck is not perceptible by a viewer. As a result, it is difficult to follow the puck from player to player, and it is especially difficult to follow the puck as it is shot toward the goal. For most viewers, recognizing that a goal has been scored probably comes after the fact when a signal light is turned on or the announcer informs the viewer that a goal has been scored. Because viewers cannot follow the puck, they do not sustain interest in the game. Although hockey is a popular sport, telecasts of hockey games would have wider appeal and be more fully enjoyed if the movement of the puck could be more closely followed.

In golf and baseball it is hard to see the ball when the ball is hit in the air for a long distance (e.g. a home run in baseball or a tee shot in golf). To compensate, cameras will zoom in on the baseball or golf ball which allows the viewers to see the ball against the sky. Such a view of the ball does not give the viewer a true perspective of the ball's path. That is, the viewer cannot determine how far the ball was hit or where the ball is in the relation to the playing field. At times a viewer of a baseball game cannot distinguish between a home run and a routine fly ball. One way to show a baseball or a golf ball in relation to the playing field is to zoom out and show the entire baseball field or golf course. However, such a zoom-out will make the ball difficult or impossible to see. Other sporting events present similar visibility problems.

Furthermore, television viewers do not have access to the same information that is available to spectators at the event (e.g. game programs, messages on the scoreboard, etc.). Thus, broadcasters may be able to sustain greater viewer interested by presenting the viewers with additional desired information and provide for the use of that information in an exciting way.

Thus, there is a need for enhancing the television presentation of objects at sporting events. However, any solution to the problem should not significantly effect the players or fans who attend the sporting event.

SUMMARY OF THE INVENTION

The present invention is directed to overcome the disadvantages of the prior art. Thus, the present invention provides for a system for enhancing the television presentation of an object at a sporting event. The system, roughly described, determines an object's location, captures a video image which includes a field of view encompassing the location of the object, determines the position of the object in the field of view of the broadcast camera capturing the video image and enhances the television presentation of the object.

One embodiment includes one or more sensors and at least one processor. The sensors are used to detect the object. Many different types of sensors can be used; therefore, the invention is not limited to any particular sensor. One exemplar sensor is an infrared sensor which detects infrared signals from an object. One infrared sensor can be used to determine the object's position in a video image from the broadcast camera. Two or more infrared sensors can be used to determine the three dimensional location of the object. The processor communicates with the sensors and is programmed to determine the object's position in the video image from the broadcast camera. If the sensor or the broadcast camera can be moved, the system includes one or more field of view sensors which provide the processor with information about the broadcast camera's (and the sensor's) field of view. A field of view sensor can include one or more of the following: a pan sensor, tilt sensor, zoom sensor, beacon or anything else used to determine the field of view of a camera or sensor. If the processor knows the three dimensional location of the object, the processor can determine the position of the object in a video frame of any broadcast camera whose field of view is known.

Various means can be used to enhance the television presentation. For example, the system can add a graphic to the video image at the position of the object in the video frame, a graphic near the position of the object in the video frame, a graphic in a location logically related to the position of the object in the video frame, statistical information or announcements related to the object's location, audio data or non-video data. In one alternative, the processor manipulates the video image. In another alternative, the processor creates a second video image and combines the video image created by the processor and the video image from the broadcast camera. Other suitable methods of manipulating television data are also within the spirit of the present invention.

These and other objects and advantages of the invention will appear more clearly from the following description in which the preferred embodiment of the invention has been set forth in conjunction with the drawings.

BRIEF DESCRIPTION OF THE DRAWINGS

FIG. 16 is a flow chart describing some of the operations of the graphics center and production center.

FIG. 18 is a flow chart describing the determination of the puck's position in a video frame and one alternative for enhancing the television presentation of the hockey puck.

FIG. 20 is a flow chart of the operation of the graphics center and production center when data is missing.

FIG. 21 is a block diagram of a remote system for interacting with a broadcast of a sporting event.

DETAILED DESCRIPTION

The present invention can be used with most video cameras known in the art. For example purposes only, the description below references a conventional broadcast television camera known in the art ("broadcast camera"). A broadcast camera captures video images in frames ("video frames"). In the United States, data is transmitted and presented on a standard television at a rate of thirty frames (60 fields) per second.

Infrared System

A. Infrared Transmitting Puck

Figure 1:
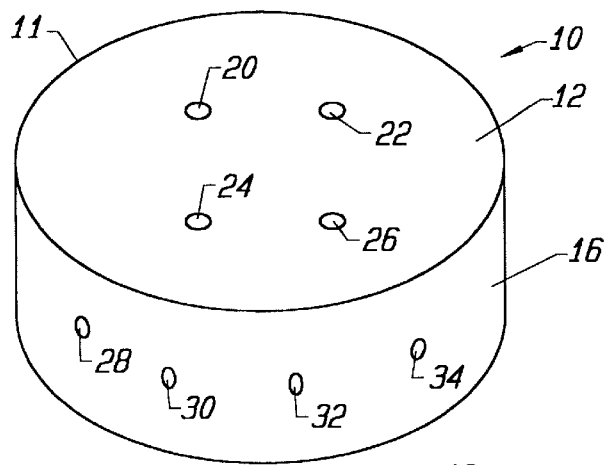
FIG. 1 depicts a perspective view of a hockey puck according to the present invention.

Conventional hockey pucks are black, cylindrically shaped, 1" thick with a 3" inch diameter, 5½–6 ounces and made of vulcanized rubber. The preferred embodiment of the hockey puck according to the present invention is shown in FIG. 1 and designated generally by the reference numeral 10. Hockey puck 10 is made in accord with conventional specifications and further includes an electromagnetic transmitter. In one embodiment, the electromagnetic transmitter includes infrared emitting diodes. Preferably (although not required), the tip of the diode is sliced off so that the diode can be flush up against the surface of the puck and the angular width of the infrared (IR) beam will be increased. As will be discussed below, alternatives to infrared emitters includes RF transmitters, radar repeaters and other devices which emit electromagnetic waves outside the visible light spectrum.

Electromagnetic waves include light, radio, X-rays, gamma rays, microwave, infrared, ultraviolet and others, all involving the propagation of electric and magnetic fields through space. The difference between the various types of electromagnetic waves are in their frequency or wavelength. The human eye is sensitive to electromagnetic radiation of wavelengths from approximately 400 to 700 nm, the range called light, visible light or the visible spectrum. Thus, the phrase "electromagnetic signal not visible to a human eye" means an electromagnetic signal outside of the visible spectrum. It is important that the signal transmitted by the hockey puck is not visible to the human eye so that the visual appearance of the puck will not be altered.

Puck 10 is comprised of a rubber body member 11 having a flat top surface 12, a flat bottom surface 14 (shown in FIG. 3) and a side surface or outer circumference 16. At the top surface are shown four infrared emitting diodes 20, 22, 24 and 26, which are fitted in bores in the puck. The bottom surface also has four infrared emitting diodes. Because of the point of view, FIG. 1 only shows four infrared emitting diodes 28, 30, 32 and 34 along outer circumference 16. The preferred hockey puck includes twelve infrared emitting diodes along outer circumference 16, spaced apart at 30° intervals. By the phrase "along an outer circumference" it is meant that the diodes are generally spaced at or near the outer circumference. For example, the diodes can be recessed (e.g. ⅟16") from the circumference and still be "along the outer circumference." If the diodes are recessed from the circumference, then there may be an indent in the surface of the puck in front of the diode. As an option, the indent could be filled with an infrared transparent epoxy or other filling material which would not change the elasticity or color of the puck. Alternatively, a lens could be placed in front of the diode.

Figure 2:
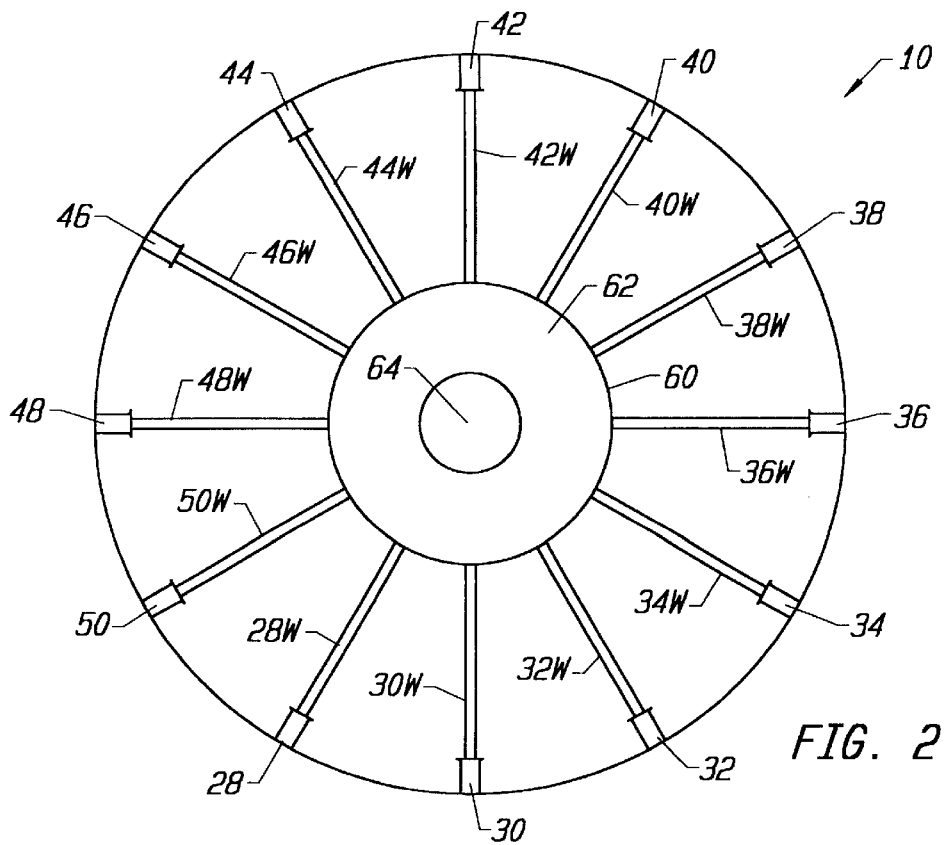
FIG. 2 depicts a cut-away plan view of the hockey puck of FIG. 1.

FIG. 2 shows a cutaway plan view of puck 10. All twelve diodes (28, 30, 32, 34, 36, 38, 40, 42, 44, 46, 48 and 50) along outer circumference 16 can be seen. Each diode is housed in a bore approximately the size of the diode. Inside of the puck is a recess 60 which receives printed circuit board 62. Mounted on printed circuit board 62 are electronics and a battery 64. Wires 28w, 30w, 32w, 34w, 36w, 38w, 40w, 42w, 44w, 46w, 48w and 50w run from printed circuit board 62 to the diodes. Battery 64 can be more than one battery vertically stacked in the center of printed circuit board 62. The battery is a lithium battery which handles cold temperatures well and has high current capability. It is important that the electronics operate sufficiently under cold temperatures because hockey pucks are traditionally frozen prior to use during a hockey game. High current capability is also important so that the infrared emitting diodes can be driven with the high current to maximize the intensity of the infrared signal. Battery 64, printed circuit board 62 and the infrared emitting diodes are held in place using a flexible epoxy, for example, DP190 by 3M. Additionally, any gaps in recess 60 not occupied by the electronics could be filled with epoxy to help secure the electronics and to maintain the pucks hardness and elasticity.

Figure 3:
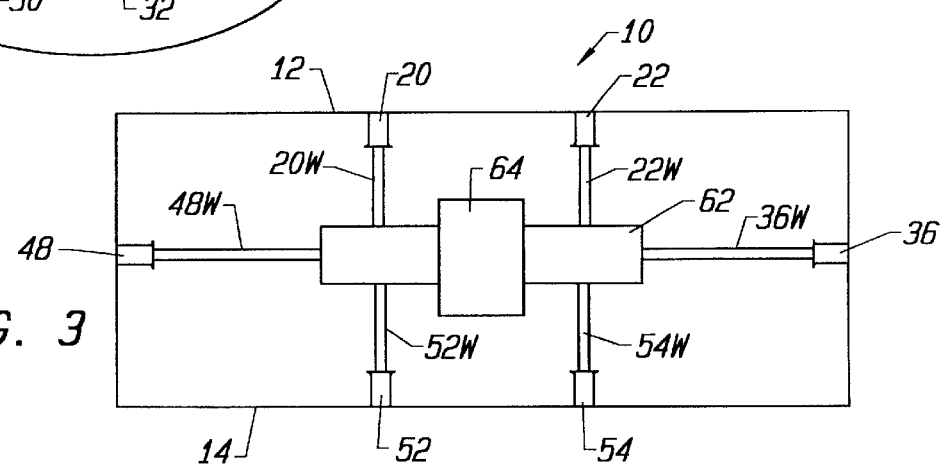
FIG. 3 depicts a cross-sectional view of the hockey puck of FIG.

FIG. 3 is a side cut-away view of hockey puck 10 showing the bottom surface 14, diodes 52 and 54 on the bottom surface and the wires (20w, 22w, 52w and 54w). As discussed above, there are four diodes along the flat lower surface of the preferred embodiment hockey puck 10. It is clear from FIGS. 2 and 3 that the components of the electromagnetic transmitter are completely disposed inside rubber body member 11. Being "completely disposed inside the rubber body member" means that the electromagnetic transmitter does not protrude outside the puck's perimeter, this includes abutting or being flush with the perimeter of rubber body member 11.

Figure 4:
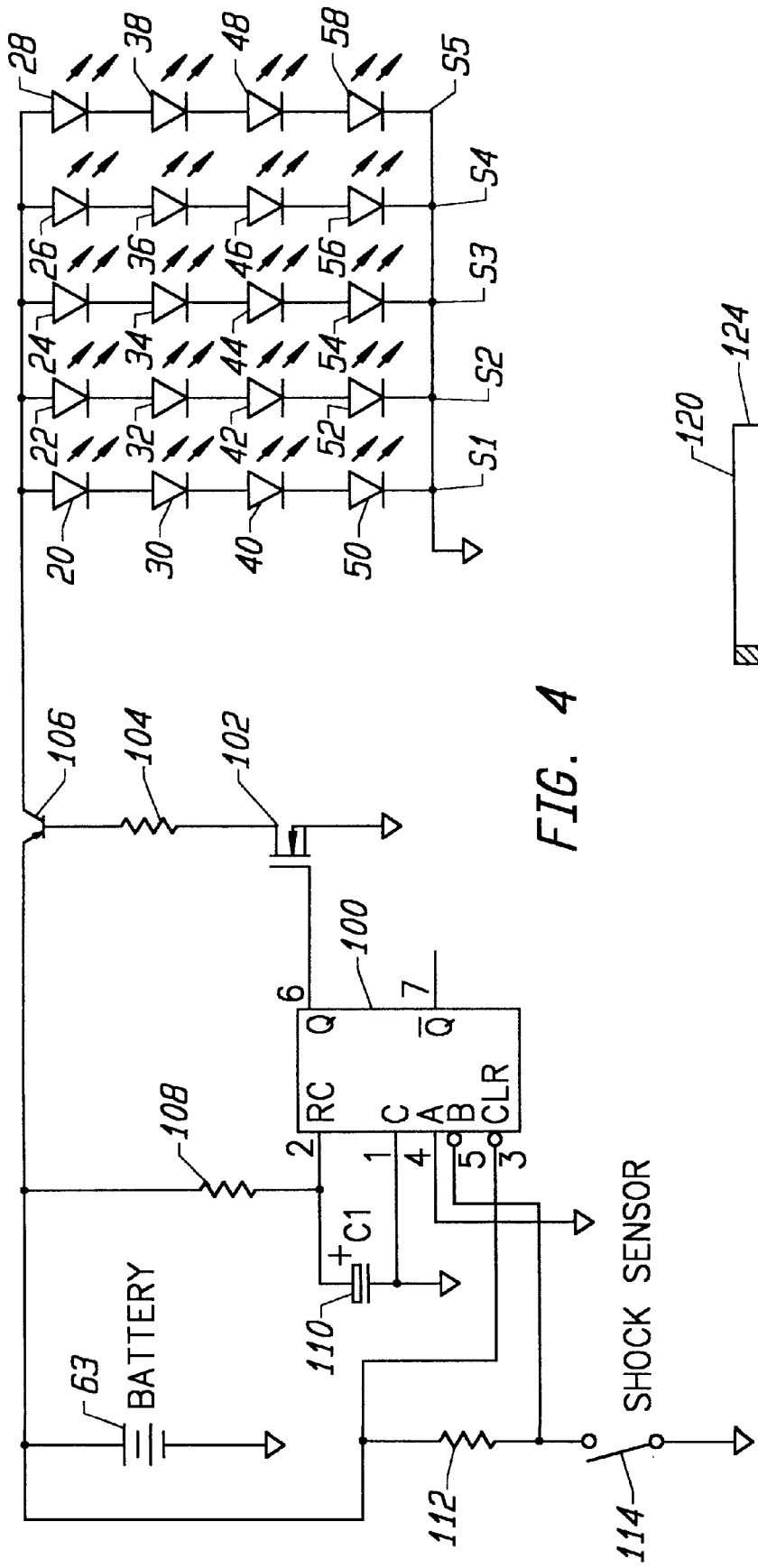
FIG. 4 shows a first embodiment electronics package for the infrared transmitter of the hockey puck of FIG. 1.

FIG. 4 is a schematic diagram of one alternative electronics package for hockey puck 10. The infrared emitting diodes 20–58 are shown as five strings of diodes (S1–S5). Each string includes four diodes connected in series. The five strings are connected to each other in parallel. Thus, if one diode fails, all of the diodes on the particular string will turn off; however, the other four strings of diodes will remain functional. In accord with this arrangement, the diodes from the various strings are interleaved throughout the puck. That is, the diodes of one string are not located next to each other. Rather, the diodes are mixed. Looking at FIG. 2, each diode is located next to a diode from another string. For example, diode 30 (which is on string S1) is between diode 28 (which is on string S5) and diode 32 (which is on string S2). This arrangement prevents the situation where one diode breaks and the entire side of the puck stops transmitting.

Timing and control circuit 100, which includes an edge trigger and a timer, produces an output interval of a width determined by resistor 108 and capacitor 110. Timing and control circuit 100 is a Motorola MC 4538 which is a dual precision re-triggerable/re-setable monostable multi-vibrator which may be triggered from either edge of an input pulse and produce an accurate output interval over a wide range of widths. In the circuit of FIG. 4, battery 63 is made up of two 3 volt batteries in series.

The Q output of timing and control 100 is connected to the gate of FET 102. The source of PET 102 is connected to ground and the drain of FET 102 is connected to the base of transistor 106 across resistor 104. The emitter of transistor 106 is connected to battery 63 and to the RC PIN of timing and control 100 across resistor 108. The RC input of control 100 is connected to capacitor 110 which is connected to the C input of timing and control circuit 100 and to ground. The A pin of timing and control circuit 100 is grounded, and the B pin is connected to shock sensor 114 and to resistor 112. The clear pin of timing and control circuit 100 and resistor 112 are both connected to battery 63.

Figure 5:
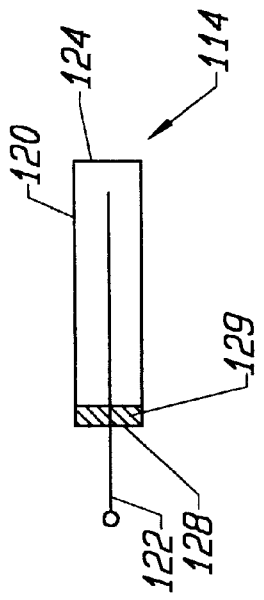
FIG. 5 depicts one exemplar shock sensor.

Shock sensor 114 is used to turn on the circuit when it senses a shock. FIG. 5 is an example of a shock sensor. Shock sensor 114 includes a wire 122 suspended inside a brass or copper tube 120. Wire 122 is attached to cap 128 with epoxy or other insulating material 129 which acts to suspend the wire inside tube 120 in a cantilevered fashion and insulates the wire. Tube 120 is mounted on board 62 and connected to the B pin of timing and control circuit 100. When shock sensor 114 is shocked (e.g. puck is jolted or hit) wire 122 bends and touches tube 120 which, for a brief moment, completes the circuit. Timing and control circuit 100 includes an edge detector which senses an edge (the circuit being closed) and turns on the puck.

Figure 6A:
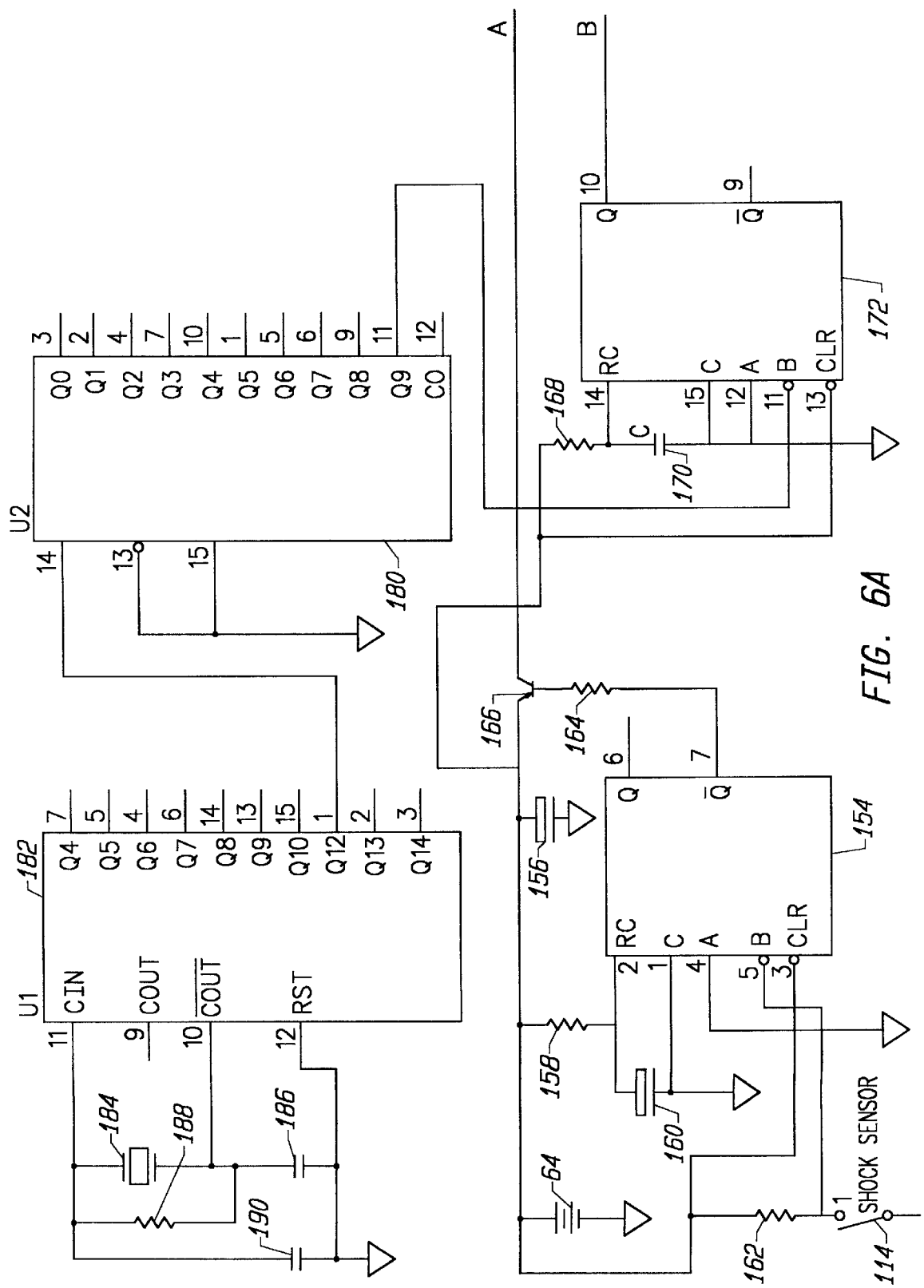
FIGS. 6A and 6B show a second embodiment electronics package for the hockey puck of FIG. 1.
Figure 6B:
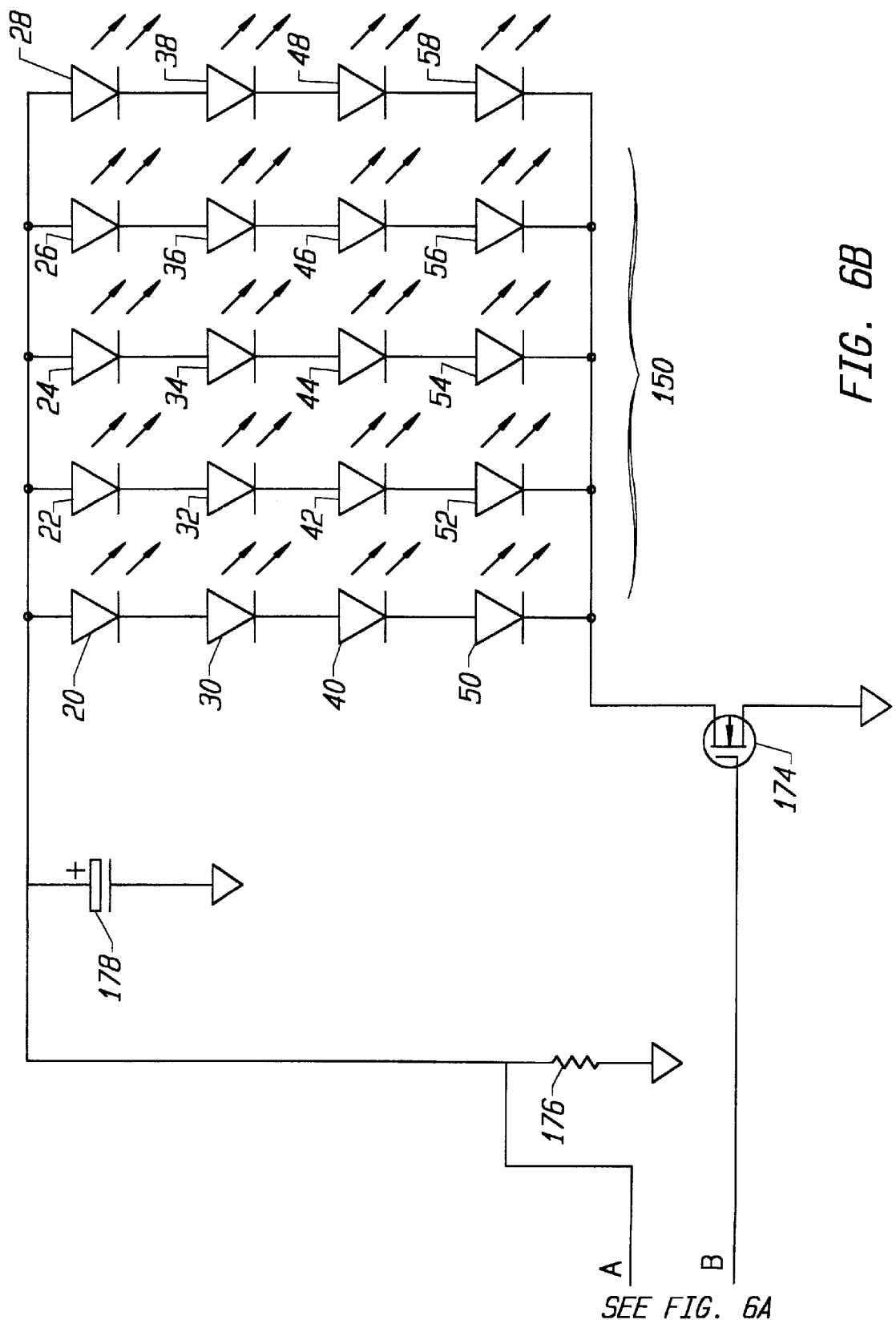

FIGS. 6A and 6B are schematics of a preferred electronics package for puck 10. Diode bank 150 is the same five strings of infrared emitting diodes depicted in FIG. 4. Although the electronics package uses twenty diodes, it is possible that the puck can be constructed and will function with more or fewer than twenty diodes. One diode by itself will produce a signal that can be detected; however, it is advantageous to have more than one diode so that the angle of the puck and location of the puck in regard to other objects will not significantly affect reception of the signal transmitted from the puck. Additional diodes also maximizes the output of the transmitters. The preferred embodiment diode is a GaAlAs infrared emitter SFH485-2, manufactured by Siemens. The SFH485-2 is an infrared emitting diode and emits radiation in the near infrared range (880 nm peak). Other infrared emitting diodes that can be used include an infrared laser diode or any other source which transmits an infrared signal. The infrared emitting diodes are used in the disclosed embodiment to emit an electromagnetic wave with a wavelength at or near 880 nm. Unlike the circuit of FIG. 4, the circuit of FIG. 6 does not continuously transmit infrared energy. Rather, the diodes are pulsed. The advantage of pulsing the diodes is to extend battery life, to increase the infrared signal (e.g. run at one amp instead of one hundred milli-amps), to improve the signal to clutter ratio by matching the sensor shuttering to the diodes pulse and to allow for subtraction as is discussed below.

Battery 64 is made up of four 3 volt lithium batteries stacked near the center of PC board 62. FIG. 6A shows timing and control circuits 154 and 172 which are the same multi-vibrator as timing and control circuit 100 in FIG. 4. Timing and control circuit 154 is used to detect a pulse from the shock sensor 114, turn on the pulsing of the diodes and automatically turn off the pulsing of the diodes after a predetermined period of time before all available power has dissipated. That is, the pulsing of the diodes turns off after a preset period of time rather than waiting for the battery to dissipate. Preferably, the diodes are turned off after 45 seconds. This prolongs the life of the battery, allows testing and prevents pucks not in use from transmitting. Connected to the RC input of timing and control circuit 154 is resistor 158 and capacitor 160, both used for timing purposes. The $\overline{Q}$ output of timing and control circuit 154 is connected, across resistor 164, to the base of transistor 166. The A input of timing and control circuit 154 is connected to ground. The B input is connected to shock sensor 114 and to the bottom of resistor 162. The clear pin of timing and control circuit 154 is connected to the top of the resistor 162, battery 64, the top of resistor 158, capacitor 156 and the emitter of transistor 166. Capacitor 156 is also connected to ground.

The clear pin to timer control circuit 172 is connected to the emitter of transistor 166 and the top of resistor 168. The RC input of a timer control 162 is connected to the bottom of resistor of 168 and to capacitor 170. The C input of timing and control 172 is connected to capacitor 170, the A input, and ground. The Q output of timing and control circuit 172 is connected to FET 174. The B input of timing and control circuit 172 is connected to the Q9 output of Divide by 10 circuit 180 (divides frequency by ten). The clock input to Divide by 10 circuit 180 is connected to the Q12 output of Divide by 16 circuit 182 (divides frequency by 16). The enable and reset pins of Divide by 10 circuit 180 are grounded. The reset pin of Divide by 16 circuit 182 is connected to capacitor 190, capacitor 186 and ground. The $\overline{\text{COUT}}$ pin of Divide by 16 circuit 182 is connected to the bottom of resistor 188, capacitor 186 and to resonator 184. Resonator 184 is a CSB1228J ceramic resonator by Murata. Resonator 184 can be mounted on printed circuit board 62 or suspended, inside the puck, within an epoxy or other material to prevent damage to the resonator from shock. The CIN pin of Divide by 16 circuit 182 is connected to resonator 184, the top of the resistor of 188 and to capacitor 190.

FET 174 is connected to infrared emitting diodes 50, 52, 54, 56 and 58. The circuit will produce five amps of current to pass through diode bank 150. Because the diodes are divided into five strings which are connected in parallel, each string receives approximately one amp. Because each string includes four diodes connected in series, each diode will receive approximately one amp of current. The collector of transistor 166 is connected to the top of resistor 176, capacitor 178, diode 20, diode 22, diode 24, diode 26 and diode 28. Capacitor 178 and the bottom of resistor 176 are connected to ground.

The circuit of FIGS. 6A and 6B provides for pulses of nominally 140 μsec at a nominal rate of 29.97 Hz. Those skilled in the art can modify the circuit to change the duration or frequency of the pulses. The pulses begin when the shock sensor is shocked. The pulses end 45 seconds after the last shock. If the shock sensor receives a shock while the puck is pulsing, the 45 second clock is reset. A shock sensor is only one of many alternatives to insure that the puck is on during play. It is anticipated that the shock to the puck when the referee drops the puck for a face off, a players hits the puck with a stick or the puck hits the boards will provide the shock necessary to trigger the circuit. While in play the puck should be hit by a player's stick or the boards at least once every 45 seconds. During the course of a game pucks are hit out of play. That is, a shot by a player goes over the boards and into the seating area. At that point it is desirable that the puck turn off. Thus, the timer is used to turn the puck off 45 seconds after the last shock. This prevents the arena from being filled with pucks continuously on.

There are at least four approaches to manufacturing a puck in accordance with the present invention. First, the electronics can be supported in an injection mold and vulcanized rubber can be injected around it. Second, the device can be in a pre-loaded package that is molded into a puck. Third, pucks can be molded into two halves with a recess in each half so that the electronics can be fitted in the combined recess when the two halves are assembled together. Fourth, existing conventional pucks could be machined into separate pieces and reassembled with the electronics package (retrofitting). In one embodiment of the fourth approach, half of two pucks would be sliced away. A recess would be carved into the remaining two halves as well as bores for each of the diodes. There is also a need to carve a very thin passage to house the leads from the electronics to the diodes. The inventors envision various other manufacturing options that are compatible with the present invention.

B. System Overview

Puck 10 is used with a system that includes one or more sensors which can be used to detect the location of the puck in three dimensional space and/or the position of the puck in a video frame. An infrared sensor can determine the angle or direction of the puck from the sensor using techniques known in the art. Two or more infrared sensors can be used to determine the tree dimensional location of the puck. The three dimensional location of the puck can be used, in conjunction with the broadcast camera's location and orientation to locate the puck in the video frame and enhance the television presentation of the puck.

Figure 7:
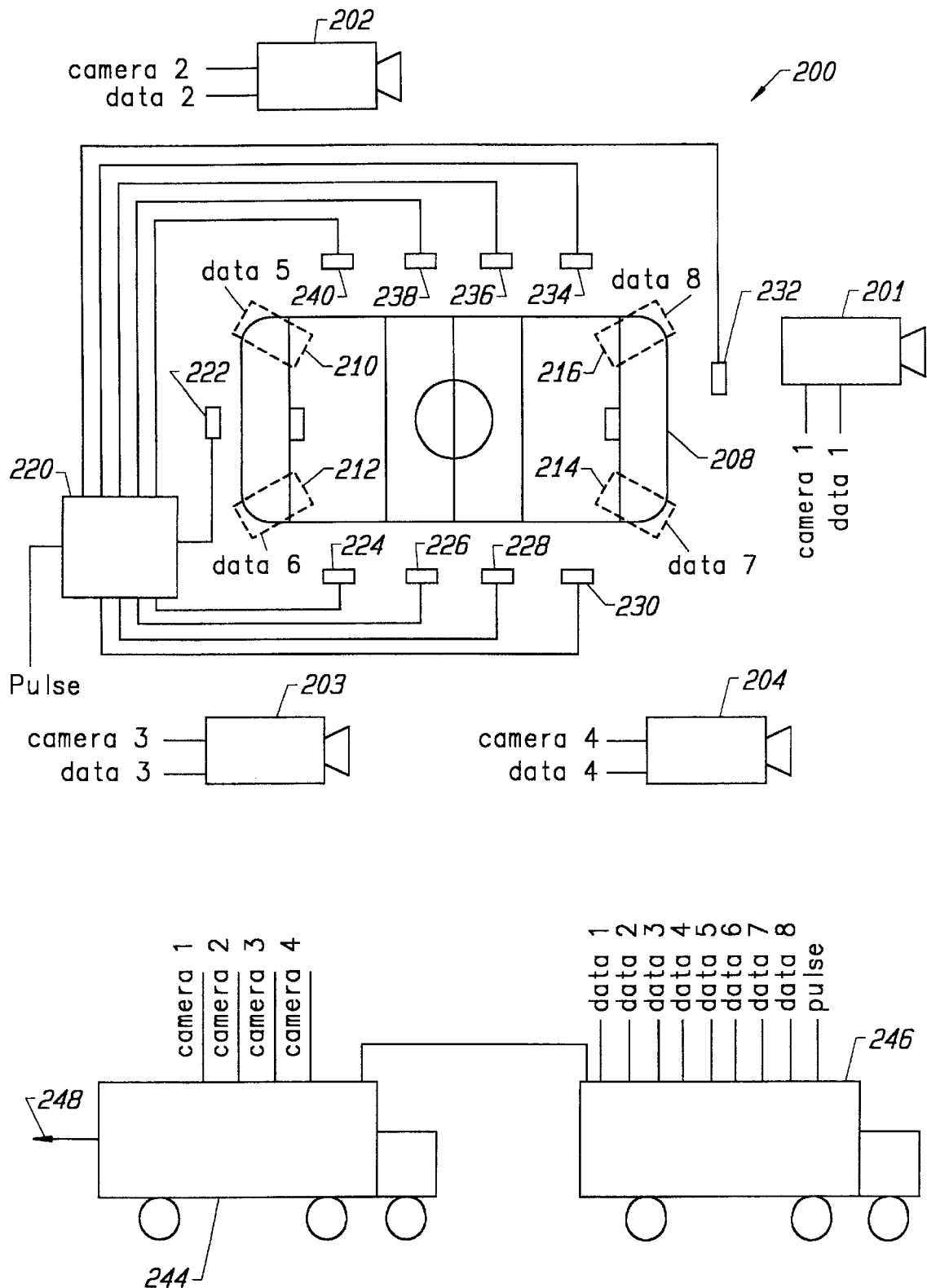
FIG. 7 is a block diagram of a system used for enhancing the television presentation of the hockey puck of FIG. 1.

FIG. 7 depicts system 200, which is one embodiment of a system that can be used to enhance the television presentation of puck 10 with the electronics package depicted in FIGS. 6A and 6B. System 200 includes four camera locations 201, 202, 203 and 204. It is possible for system 200 to function with only one camera location; however, to provide a viewer with multiple angles of view it is desired to have up to four or more camera locations. The various camera locations can be located anywhere in the arena suitable for capturing video images of puck 10 in hockey rink 208. Each camera location includes a broadcast camera and communicates with graphics center 246. As shown, signal data 1 transmits data between camera location 201 and graphics center 246, signal data 2 transmits data between camera location 202 and graphics center 246, signal data 3 transmits data between camera location 203 and graphics center 246 and signal data four transmits data between camera location 204 and graphics center 246. In one embodiment, graphics center 246 includes computers and video equipment housed in a truck.

The camera locations also communicate with a television production center 244. The signal camera 1 indicates communication between camera location 201 and production center 244, camera 2 indicates communication Between camera location 202 and production center 244, camera 3 indicates communication between camera location 203 and production center 244, and signal camera 4 indicates communication between camera location 204 and production center 244. In one embodiment, the television production center is a truck including various video and audio equipment. Both the graphics center 246 and the video production center 244 can exist in various forms and can be located in various locations that can maintain the communications with the camera locations and sensors as described below.

System 200 includes one or more infrared sensors. To ease setup, wiring and maintenance, as well as increase the chance that the puck will be in the field of view of an infrared sensor, one or more infrared sensors are located at the camera locations. However, locating infrared sensors at the camera locations is optional. The sensors at the camera locations communicate with graphics center 246 via data 1, data 2, data 3 and data 4. System 200 also includes additional sensor locations, 210, 212, 214 and 216, which are not located at the camera locations. The signal data 5 indicates communication between infrared sensor location 210 and graphics center 246. The signal data 6 indicates communication between infrared sensor location 212 and graphics center 246. The signal data 7 indicates communication between infrared sensor location 214 and graphics center 246. The signal data 8 indicates communication between infrared sensor location 216 and graphics center 246.

System 200 also includes collector box 220 which is connected to pulse detectors 222, 224, 226, 228, 230, 232, 234, 236, 238 and 240. The pulse detectors detect when puck 10 is pulsing on and transmit signals to the infrared sensors in order to open the shutter of the infrared sensors in synchronization with the puck's pulses. A system that uses a puck which continuously transmits an infrared signal would not need pulse detectors. The pulse detectors shown in FIG. 7 are located at the top of the glass which surrounds the ice. Additional pulse detectors (optional) are mounted from the ceiling or other suitable locations in the arena. The components shown in FIG. 7 will be discussed in more detail below.

C. Camera Location

Figure 8:
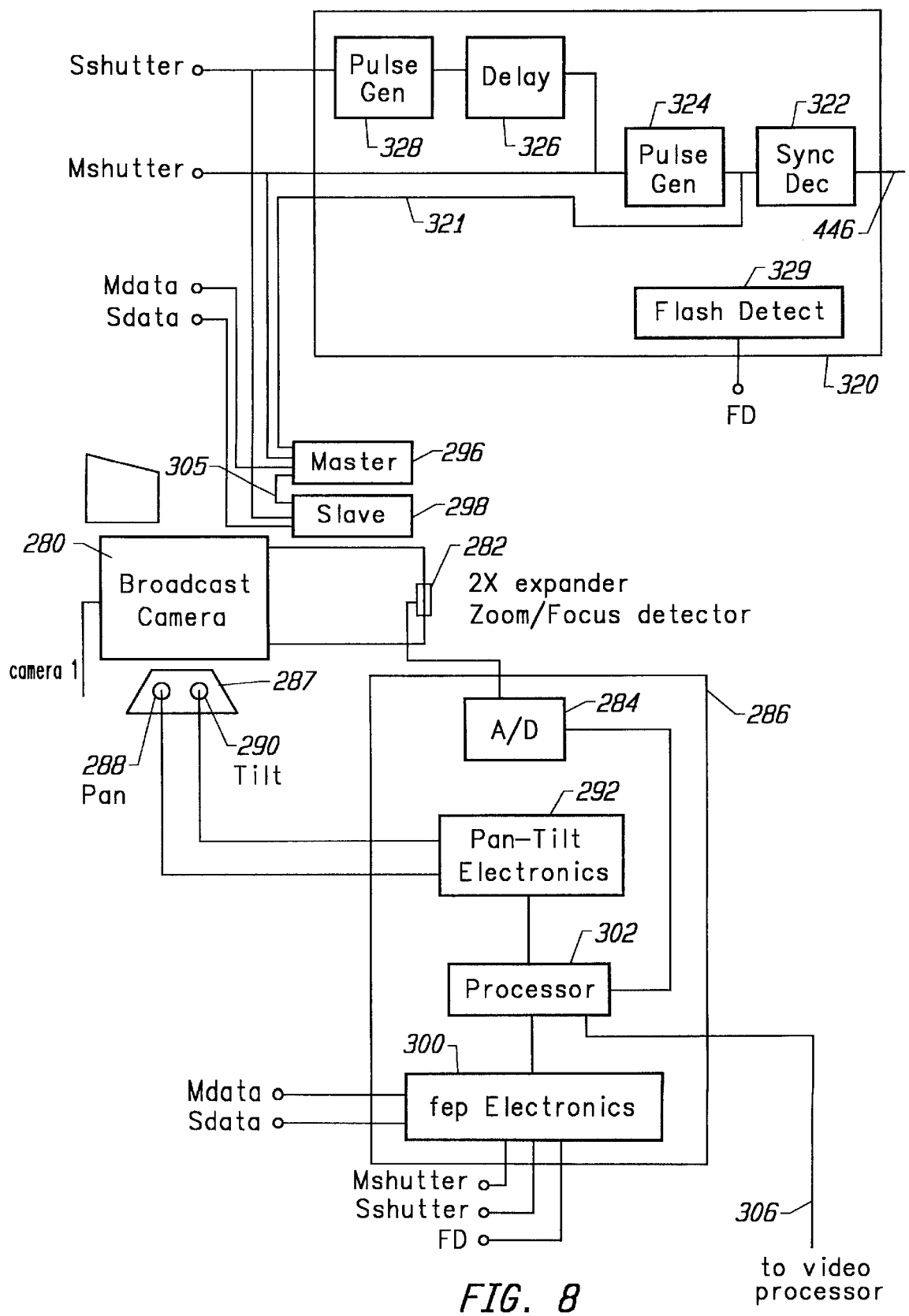
FIG. 8 is a block diagram of a camera location for the system of FIG. 7.

FIG. 8 shows one embodiment of the camera location. Broadcast camera 280 captures a video frame which is sent to a production center 244 as shown by the signal camera 1. Broadcast camera 280 has a zoom lens including a 2× expander. Connected to broadcast camera 280 is a 2× expander/zoom/focus sensor 282 (collectively a "zoom sensor") which senses the zoom of the camera, the focal length of the camera, and whether the 2× expander is being used. The analog output of sensor 282 is sent to an analog to digital converter 284, which converts the analog signal to a digital signal and transmits the digital signal to processor 302. Broadcast camera 280 is mounted on tripod 287 which enables broadcast camera 280 to tilt and pan. Attached to tripod 287 are pan sensor 288 and tilt sensor 290, both of which are connected to pan-tilt electronics 292.

Remote processor unit 286 is a rack mounted system including analog to digital converter 284, pan-tilt electronics 292, processor 302 and front end processor electronics 300. Processor 302 is an Intel 486 microprocessor with supporting electronics; however, various other processors can be substituted. Processor 302 includes memory and disks to store data and the software described below. In addition to being connected to the other boards in front end processor 286, processor 302 is in communication with graphics center 246, as indicated by signal 306. In one embodiment, pan sensor 288 and tilt sensor 290 are optical encoders that output a signal, measured as a number of clicks, indicating the rotation of a shaft. Forty thousand clicks represent a full 360 degree rotation. Thus, a computer can divide the number of measured clicks by forty thousand and multiply by 360 to determine the pan or tilt angle. The pan and tilt sensors use standard technology known in the art and can be replaced by other suitable pan and tilt sensors known by those skilled in the relevant art. Pan-tilt electronics 292 receives the output of pan sensor 288 and tilt sensor 290, converts the outputs to a digital signal, representing pan and tilt, and transmits the digital signal to processor 302. The pan, tilt and zoom sensors are used to determine the field of view of the broadcast camera and, in some cases, the field of view of an infrared sensor. Thus, one or more of the pan, tilt or zoom sensors can also be labelled as a field of view sensor. For example, if the camera cannot zoom or tilt, the field of view sensor would only include a pan sensor. One alternative field of view sensor includes placing marks in various locations on the hockey rink such that each mark looks different and at least one mark will always be visible to the camera while the camera is pointed at the hockey rink. A computer using optical recognition technology can find the mark in the video frame and, based on the mark's size and position in the video frame, determine the field of view and/or pan, tilt and zoom of the camera. Another alterative includes placing infrared emitters or beacons along the rink (e.g. on the glass). If each beacon has a unique appearance, then a computer can determine the infrared sensor's field of view based on the size of the received signal's size and location in the infrared sensor's frame of data. If an infrared sensor is mounted on a broadcast camera, determining the pan and tilt of one also determines the pan and tilt for the other (plus a known offset). Another alternative includes using pan and tilt sensors to get a rough estimate of field of view and using beacons to fine tune the field of view determination.

The camera location also includes two infrared sensors, master sensor 296 and slave sensor 298, both of which are connected to front end processor electronics 300 and sensor interface box 320. Although the system will function with only one sensor at each location, two sensors are used in master and slave configuration in order to perform substraction which will be discussed below. Master sensor 296 and slave sensor 298 are mounted near one another (e.g. next to each other) so that their optical axes are near each other. It is possible to mount the two sensors away from each other and correct for the misalignment of optical axis. Furthermore, both sensors are mounted on broadcast camera 280 so that they are pointed in the same direction as broadcast camera 280. This is done because it is contemplated that a camera operator will be tilting and panning broadcast camera 280 to follow the puck, and mounting the sensors on broadcast camera 280 will increase the chance that the sensors will be pointed at the puck. Pan sensor 288 and tilt sensor 290 will indicate where the master and slave sensors are pointing. However, it is not necessary to mount the sensors on the broadcast camera. The internal clocks of the master sensor 296 and slave sensor 298 are synchronized as indicated by signal 305.

The preferred infrared sensor is a progressive scan,, full frame shutter camera, for example, the TM-9701 by Pulnix. The Pulnix sensor is a high resolution 768(H) by 484(V) black and white full frame shutter camera with asynchronous reset capability. The camera has an eight bit digital signal output and progressively scans 525 lines of video data. A narrow band infrared filter, which passes electromagnetic waves of approximately 880 nm +/−45 nm, is affixed in front of the lens of the Pulnix sensor. The purpose of the filter is to block electromagnetic signals that are outside the spectrum of the signal from the puck; thus, significantly reducing background clutter.

Each sensor captures a video frame which comprises a set of pixels. Each pixel is assigned a coordinate corresponding to an X axis and a Y axis. The sensor data includes an eight bit brightness value for each pixel. The eight bit brightness values are scanned out pixel by pixel to front end processor electronics 300 from master sensor 296 via the signal Mdata and from slave sensor 298 via the signal Sdata.

Sensor interface box 320 sends the shutter command and horizontal drive to the infrared sensors. Signal 446 from the pulse detection system (described below) is decoded by sync decoder 322 to extract horizontal drive signal 321 which is communicated to master sensor 296. Horizontal drive signal 321 is used to phase lock the master sensor's internal clock to the puck. Signal 321 is also sent to pulse generator circuit 324 to produce a shutter control signal (Mshutter) at least 120 $\mu$sec wide, which is transmitted to master sensor 296. The output of pulse generator 324 is also sent to delay circuit 326 to provide a signal delayed by approximately 60 $\mu$sec for pulse generator 328. The output of pulse generator 328 (Sshutter), an approximately 120 $\mu$sec wide pulse used to control the shutter, is sent to slave sensor 298. Both shutter control signals (Mshutter and Sshutter) are also sent to computer 286 for diagnostic purposes.

Many arenas do not allow photographers to use flashes on their cameras in order to prevent impairing the players' vision from random flashes. In lieu of individual camera flashes, many arenas install a set of strobe flashes at or near the ceiling of the arenas and provide for communication between each photographer's camera and the set of strobe flashes. When the photographer takes a picture, the strobe flashes emit a flash of light, which may include an electromagnetic wave in the infrared spectrum. In one embodiment, the system avoids incorrect data due to a sensor detecting a flash by ignoring data sensed during a flash. One means for preventing the incorrect data is to use filters. A second embodiment connects a signal from the strobe flash to the sensors or a computer which causes the system to ignore data sensed during a flash. A third embodiment includes using flash detectors. The flash detectors can be located anywhere in the arena suitable for sensing a strobe flash. For manufacturing convenience, one alternative includes a flash detector 329 as part of the sensor interface box 320. When flash detector 329 senses a flash a signal FD is sent to front end processor electronics 300. In some environments, a flash detection system may not be necessary.

In addition to mounting sensors on broadcast cameras in the camera locations, additional sensors 210–216 are mounted throughout the arena to improve sensor coverage. Each sensor location, 210, 212, 214 and 216, includes two sensors in master and slave configuration. Sensors 210–216 are preferably mounted above the rink so that the field of view of the sensors overlaps and each location on the ice is within the field of view of two sensors. Sensor locations 210, 212, 214 and 216 do not include broadcast cameras and pan/tilt/zoom detectors. Since the sensor at sensor locations 210–216 cannot pan, tilt or zoom, control system 606 (FIG. 15) stores the location, pan and tilt of the sensors. Each sensor location also includes a processor 302 and front end processor electronics 300.

Figure 9:
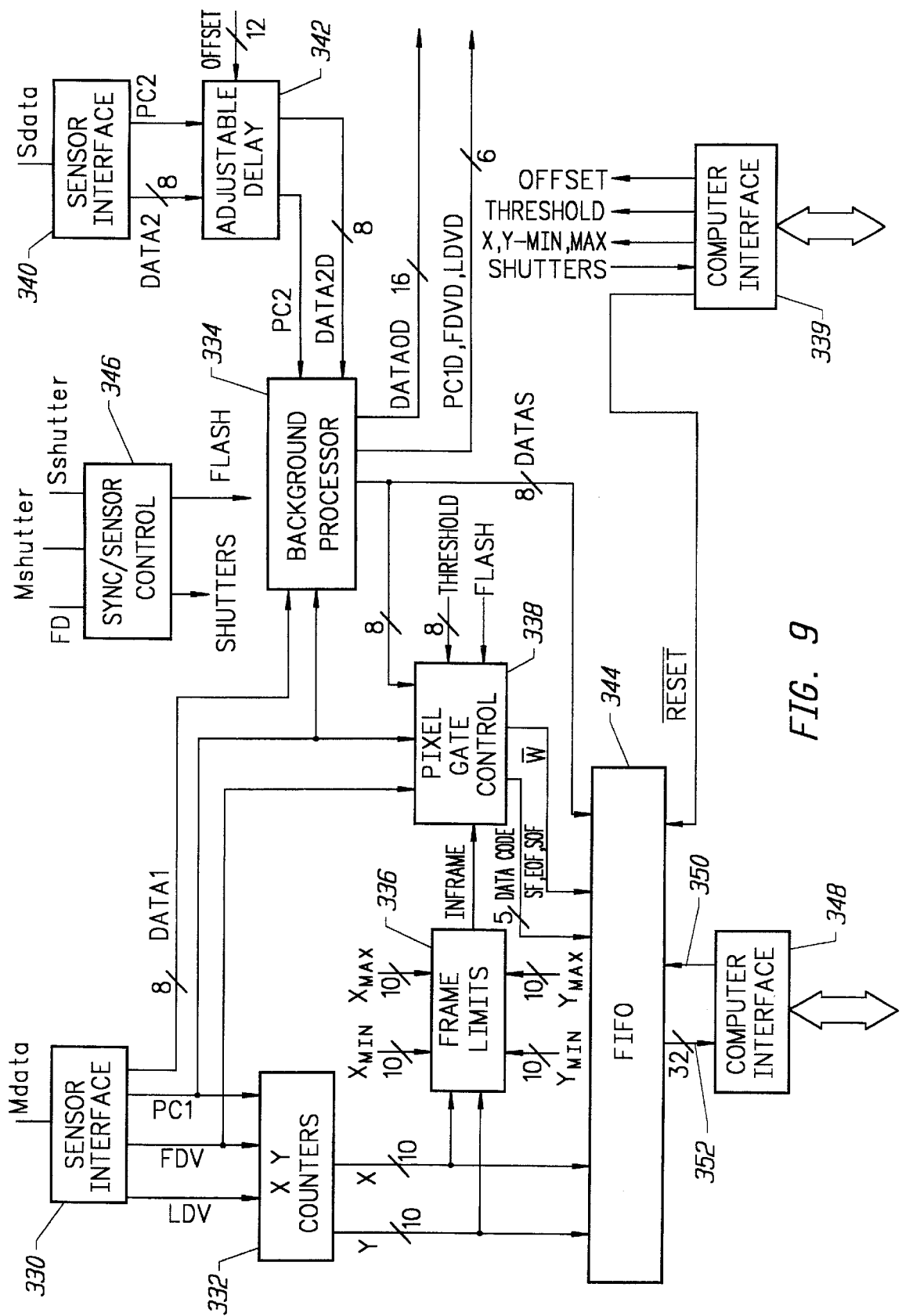
FIG. 9 is a block diagram of the front end processor electronics of FIG. 8.

FIG. 9 shows a block diagram of front end processor electronics 300. Sensor interface 330 receives data (Mdata) from master sensor 296, including the eight bit data for each pixel. Sensor interface 330 has four output signals: LDV, FDV, PC1 and DATA1. LDV (line data valid) is transmitted to XY counters 332 and indicates that a new line of valid data is being scanned out of master sensor 296. FDV (frame data valid), which is transmitted to XY control 332 and pixel gate counter 338, indicates that valid data for the next frame is being transmitted. PC1 (pixel clock 1) is a 14.318 MHz clock from master sensor 296 and is sent to XY counters 332, pixel gate control 338 and background processor 334. DATA1 is transmitted to background processor 334. XY counters 332 counts X and Y coordinates sequentially in order to keep track of the pixel of whose data is being scanned in at the current time. When LDV is asserted, the X counter is reset. When FDV is asserted, the Y counter is reset.

As XY counters 332 sequentially count the coordinates of the pixels, frame limits 336 determines whether the coordinate of the particular pixel being scanned in is within the valid frame limits. The valid frame limits includes pixels in a rectangular box within the frame of the sensor 296 which is determined by the values of $X_{min}$, $X_{max}$, $Y_{min}$, and $Y_{max}$, all four of which are supplied from registers in processor 302 via computer interface 339. The registers in processor 302 are set by software in computer 606. (See FIG. 15.) These values can be set based on the sensor location and orientation. For example, if half of the field of view of the sensor 296 is above the hockey rink or below the hockey rink, there is no need to consider data that is not within the hockey rink. This avoids sensing spurious sources. When frame limit 336 determines that the pixel is within the valid frame limits, the signal INFRAME is asserted and transmitted to pixel gate control 338.

Sensor interface 340 receives data (Sdata) from slave sensor 298 and communicates the eight bit pixel data and PC2 (pixel clock two) to adjustable delay 342. There is no need to send a version of the signal LDV and FDV for slave sensor 298 because master 296 and slave 298 are synchronized by signal 305 (FIG. 8). Adjustable delay 342 is an adjustable shift register for aligning the optical data from the master and slave sensors. The amount of delay is determined by the variable OFFSET which is a twelve bit signal sent from processor 302 via computer interface 339. OFFSET is set in processor 300 via a user interface residing on computer 606 or a local user interface. (See FIG. 15.) The data from the two sensors are optically aligned because the two sensors will be mounted on top of each other or next to each other, therefore, having different optical axes. One alternative is to use one optical axis for both sensors, for example, using a prism to transmit one image to two sensors, which in turn are optically aligned. The delayed data (PC2 and DATA2D) is transmitted to background processor 334.

Background processor 334 is an Arithmetic Logic Unit with a set of registers. Alternatively, background processor 334 could be a microprocessor. Background processor 334 aligns the data based on the pixel clocks and subtracts the two sets of data (DATA1 and DATA2). There are two types of subtraction that can be used; temporal subtraction and spectral subtraction, although either or both methods can be used, the preferred background processor 334 only performs temporal subtraction. The technique of temporal subtraction utilizes two sensors with similar field of views, opening their shutter at different times. The master sensor's shutter is open and captures data during an infrared pulse from puck 10. The slave sensor's shutter is open and captures data between pulses from puck 10. Therefore, master 296 and slave 298 sense substantially similar images except master sees the field of view with the puck on and slave sees almost the same field of view without the puck. If the two sets of data are subtracted, the difference should be the signal from the puck. Background processor 334 performs that subtraction. In the particular embodiment disclosed, master sensor 296 opens its shutter for 127 $\mu$sec. After master sensor 296 closes its shutter, both master and slave keep their shutters closed for 63 $\mu$sec. Subsequently, slave 298 opens its shutter for 127 $\mu$sec. followed by both shutters being closed for the remainder of the frame's 1/30 of one second. This process repeats itself approximately every 1/30 of a second based on the strobing of the puck which will be described below.

Spectral subtraction utilizes two sensors that have substantially similar field of views, but detect different spectrums. One spectrum includes the puck's pulse and the second spectrum does not. For example, master 296 would use the filter discussed above which passes wavelengths of 880+/−45 nm. However, slave 298 would use a filter that allows a bandwidth near but not including the bandwidth of master 296. The shutters of both the master 296 and slave 298 would open and close at the same time, creating two sets of data. Theoretically, the two sets of data would differ in that one would include the puck and one would not. Subtracting the two sets of data causes most data to cancel out, except for the puck's signal.

The output of background processor 334 is eight bit DATA5 which is sent to pixel gate control 338 and FIFO 344. Pixel gate control 338 is used to determine whether data is valid and to store that data in FIFO 334. Pixel gate control 338 uses three criteria to determine whether the data is valid. The first criteria is to determine whether the data is within the valid frame limits. The second criteria is to determine whether the data has met a certain brightness THRESHOLD. Certain pixels are so dim that they cannot be valid data. A variable THRESHOLD is used as a brightness threshold. All data with a brightness below the THRESHOLD value is discarded. Pixel gate control 338 receives THRESHOLD from register processor 302 via computer interface 338.

THRESHOLD is set from a graphical interface in computer 606 (or a local interface) based on the environment surrounding the sensors and will usually be determined by trial and error or measurement at each sensor location.

The third criteria to determine whether the data is valid is to find out whether the data was captured during a flash. When a flash is detected sync/sensor control 346 receives a signal FD indicating a flash and forwards this signal to pixel gate control 338. If pixel gate control 338 determines that the coordinates of the pixel are within the frame limit, DATAS is above the THRESHOLD and there is no flash during the frame, pixel gate control will assert $\overline{w}$ (write enable) to FIFO 334 to cause FIFO 334 to store the pixel coordinates (X,Y) from XY counters 332, a data code and eight bit DATAS. The data code indicates whether FIFO 334 is storing valid data, a strobe flash indicator (SF), an end of frame indicator (EOF) or a start of frame indicator (SOF). If the data is not within the frame limits, or not above the THRESHOLD, pixel gate control 338 will not assert $\overline{w}$. If there is a flash during a frame, pixel gate control 338 will assert $\overline{w}$, and store SF in the data code field.

Background processor 334 also sends output signals DATA0D (16 bits), PC1D (2 bits), FDVD (2 bits), and LDVD (2 bits) to optional data monitors. DATA0D is DATAS sent as differential data. PC1D is pixel clock 1 sent as differential data. FDVD is frame data valid sent as differential data. LVDV is line data valid sent as differential data.

Computer interface 334 also transmits a reset signal to FIFO 344 to reset the FIFO when the system is being started up. Processor 302, via computer interface 348, sends a read control signal 350 to FIFO 344 in order to request data from FIFO 344. The output of FIFO 344 is a 32 bit data of the output pulses from counters 504 and 510. If the output pulse from counter 504 leads the output pulse from counter 510, the up/down counter will count down. If the output pulse from counter 504 lags the output pulse from counter 510, the up/down counter will count up. If the pulses from counters 504 and 510 overlap, the up/down counter will not count up or down. Under this condition, the circuit is locked to input pulse stream 220 and the sum of the counter settings for counters 506 and 508 represent the number of clock pulses from circuit 500 occurring in the period of pulses 221. The circuit will track the period of pulse stream 220 as the period varies over time or from puck to puck. Circuit 514 contains diagnostic LEDs to indicate the presence of pulse signals 221 and a "locked" condition on counter 508.

The counter settings from counter 506 $FD_{0-15}$ and counter 508 $TD_{0-15}$ are added together in oscillator adder circuit 518. The counter settings are also read into a computer (not shown) through a parallel port where they are added and averaged. Jumper 519 is used to select either the sum from circuit 518 or the computer averaged sum output. Since these sums represent the period for pulse signal 220, they are used to control the period of oscillator counter 512. This circuit will run continuously in the absence of pulses 220 and provides a "coasting" feature to control the shutter of the infrared sensors with or without the presence of the pulses from puck 10. The oscillator phase is reset by the output of counter 502 passing through reset gate 516. The gate is opened by the "burst" signal from counter 508. This signal is present during valid pulse tracking intervals and represents the overlap of the pulses from counters 504 and 510.

The output pulse from oscillator 512 starts shutter delay counter 520. The output of this counter is sent to phase-locked loop 542. The delay count for shutter delay counter 520 is selected by jumper 522 from the control values for counter 508 ($TD_{0-15}$) or from a computer average of the $TD_{0-15}$ data. The output of counter 520 controls camera shuttering and occurs at a nominal rate of 30 Hz. This signal is used to control phase-locked loop 542 running at nominally 15,750 Hz. Divider 544 divides the output of phase-locked loop 542 by five hundred and signal 352 which is sent to computer interface 348 which aligns the data and presents the data to processor 302.

Figure 10:
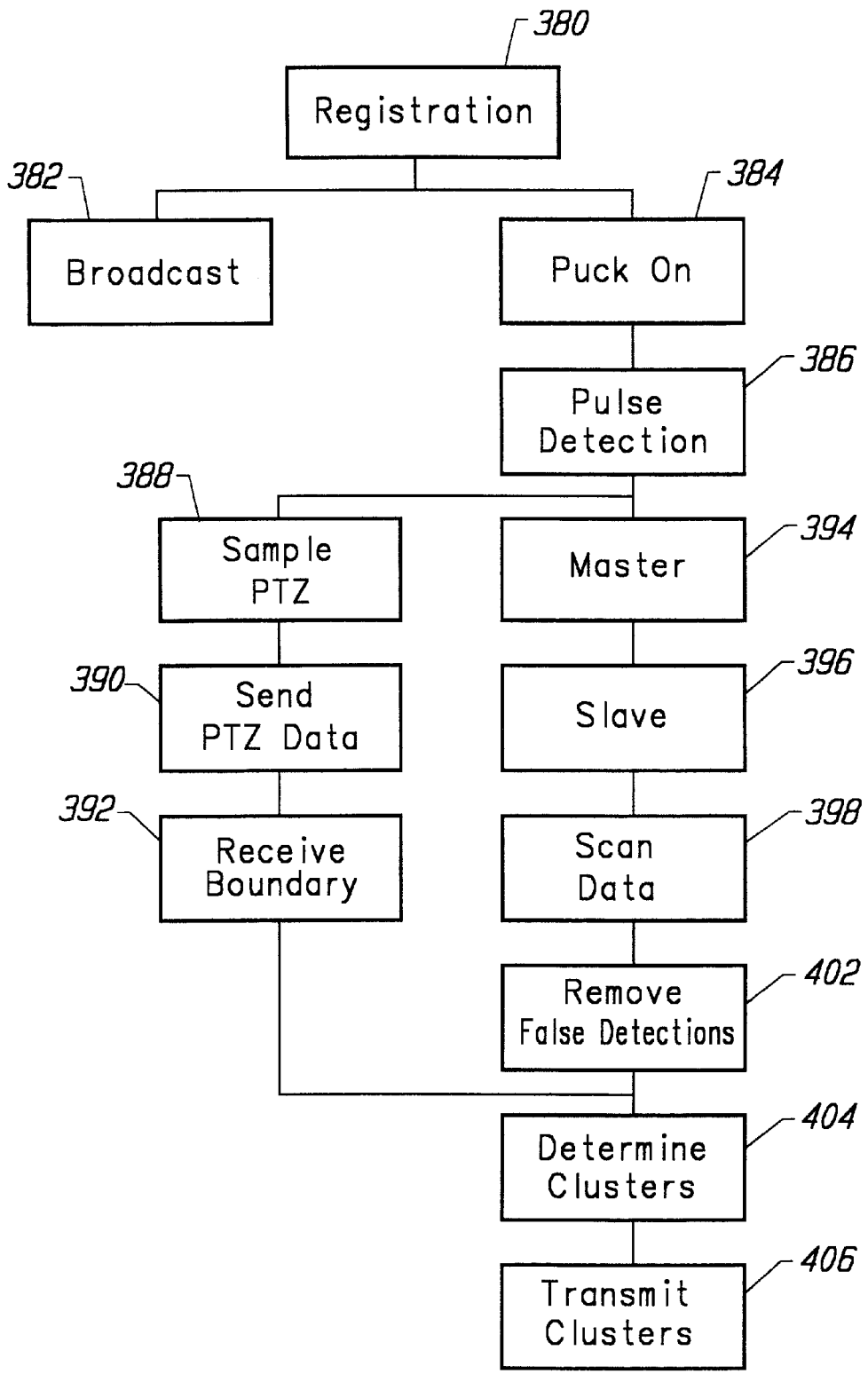
FIG. 10 is a flow chart describing some of the operations in the camera location and related hardware.

FIG. 10 describes the operations in the camera location and related hardware. The first step depicted is registration and initialization 380. This step, which will be discussed in more detail below, includes initializing and calibrating the hardware. Once normal operation begins during a television presentation, broadcast camera 280 begins selectively broadcasting the hockey game (step 382) and, concurrently, steps 384–406 are performed. By selective broadcasting it is meant that the broadcast camera captures video images and sends those images to production center 244. A manager in production center 248 may or may not use those particular video images.

In step 384, puck 10 is turned on (e.g. starts pulsing). While puck 10 is transmitting pulses, one or more pulse detectors (discussed below) detect the puck's pulses and a shutter command is sent to the infrared sensors (step 386). Although step 386 is drawn above step 388, step 386 is continuous and occurs before, after and/or during step 388. During normal operation, two sets of operations occur: steps 388–392 and steps 394–404. In step 388 analog to digital converter 284 and pan-tilt electronics 292 sample the pan, tilt and zoom values. In step 390, these values are sent to processor 302 which transmits the values to graphics center 246. In step 392, processor 302 receives the X and Y boundaries ($X_{min}$, $X_{max}$, $Y_{min}$, $Y_{max}$) from graphics center 246 and transmits those values to frame limits 336 via computer interface 338. Alternatively, the X and Y boundaries can be determined by processor 302. In step 394, master sensor 296 opens its shutter for 127 $\mu$sec and captures (or creates) data representing a position of puck 10 in the field of view of master sensor 296. In step 396, slave sensor 298 opens its shutter for 127 $\mu$sec. and captures (or creates) data. In step 398, data is serially scanned in for each pixel for both sensors. Step 398 could be divided into two separate steps. In step 402, false detections (including noise) are removed, which includes subtraction, brightness threshold, frame limits, flash detection, region of play filters and exclusion zones. Region of play filters and exclusion zones are discussed below. The system also utilizes pulsing, infrared filters on the sensors and infrared reduction through filtering or polarization of spurious sources for assisting the detection of the puck's signal from noise and clutter. The infrared reduction is accomplished by placing filters that remove infrared signals in front of all or some of other electromagnetic emitting sources in the arena (e.g. scoreboard). Although the system uses the above listed methods to enhance performance, a system can be designed to function without any of the listed methods or with a subset of the listed methods. After false detections are removed, valid data is stored in FIFO 344. In step 404, clusters are determined, and in step 406 cluster information is transmitted to graphics center 246.

Figure 11:
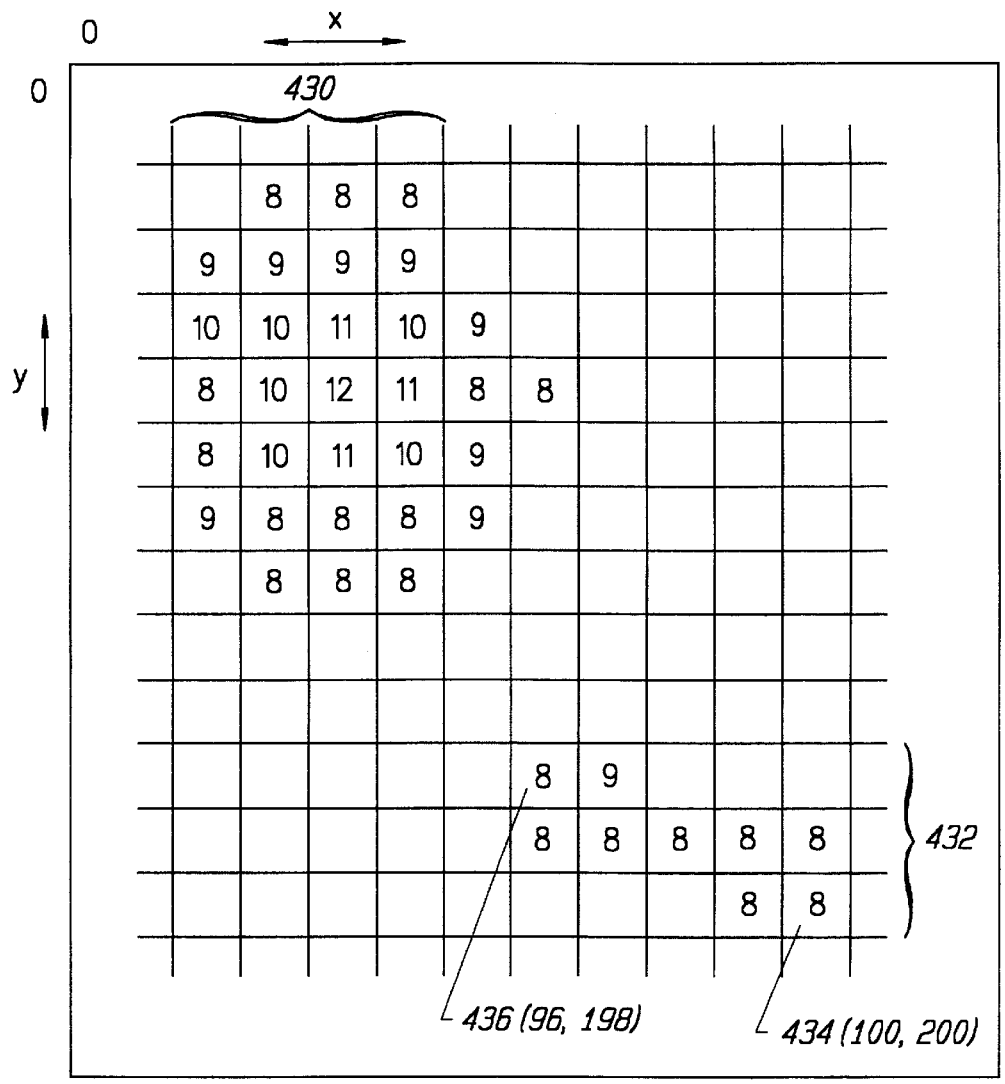
FIG. 11 is a graphical representation of data from the infrared sensors.

The data that passes the tests of step 402 tends to be represented as clusters of pixels. Thus, the system can save time transferring sensor information from the camera location to the graphics processing center 246 by sending information which characterizes the clusters instead of individual pixel values. Characterizing these clusters is the tasks performed in step 404. The advantage of clustering is that it saves bandwidth and distributes computer power. A cluster is defined as a group of valid pixels that border each other. FIG. 11 shows a portion of a frame of data. For example purposes only, the THRESHOLD value set for this particular frame of data is eight. Thus, only pixels that have the brightness of eight or greater are stored in FIFO 344. Each square in FIG. 11 represents a pixel and the number in that square represents the brightness of the pixel. The pixels with no numbers have a brightness less than eight. The portion of the frame depicted includes two clusters 430 and 432. The first row of cluster 430 includes three pixels having brightness of eight. The second row of cluster 430 includes four pixels having brightness of nine. The first row of cluster 432 includes two pixels, the first pixel having a brightness of eight and the second pixel having a brightness of nine.

For each cluster, a data structure is set up analogous to a structure in the C programming language. The field of the structure includes MINX, MAXX, MINY, MAXY, TOTAL ENERGY and MAX ENERGY. MINX is the minimum X value of any of the pixels in the cluster. MAXX is the maximum X value of any of the pixels in the cluster. MINY is the minimum Y value of any of the pixels in the cluster. MAXY is the maximum Y value of any of the pixels in the cluster. Note that the X and Y values are the coordinates of pixels in the frame. For example, point 436 has the coordinates 96, 198 and point 434 has the coordinates 100, 200. TOTAL ENERGY is the sum of the brightness of all of the pixels in the cluster, and MAX energy is the brightness of the brightest pixel in the cluster. Thus, for cluster 432 MINX equals 96, MAXX equals 100, MINY equals 198, MAXY equals 200, TOTAL ENERGY equals 73, and MAX energy equals 9.

D. Sync and Flash Detectors

Figure 12:
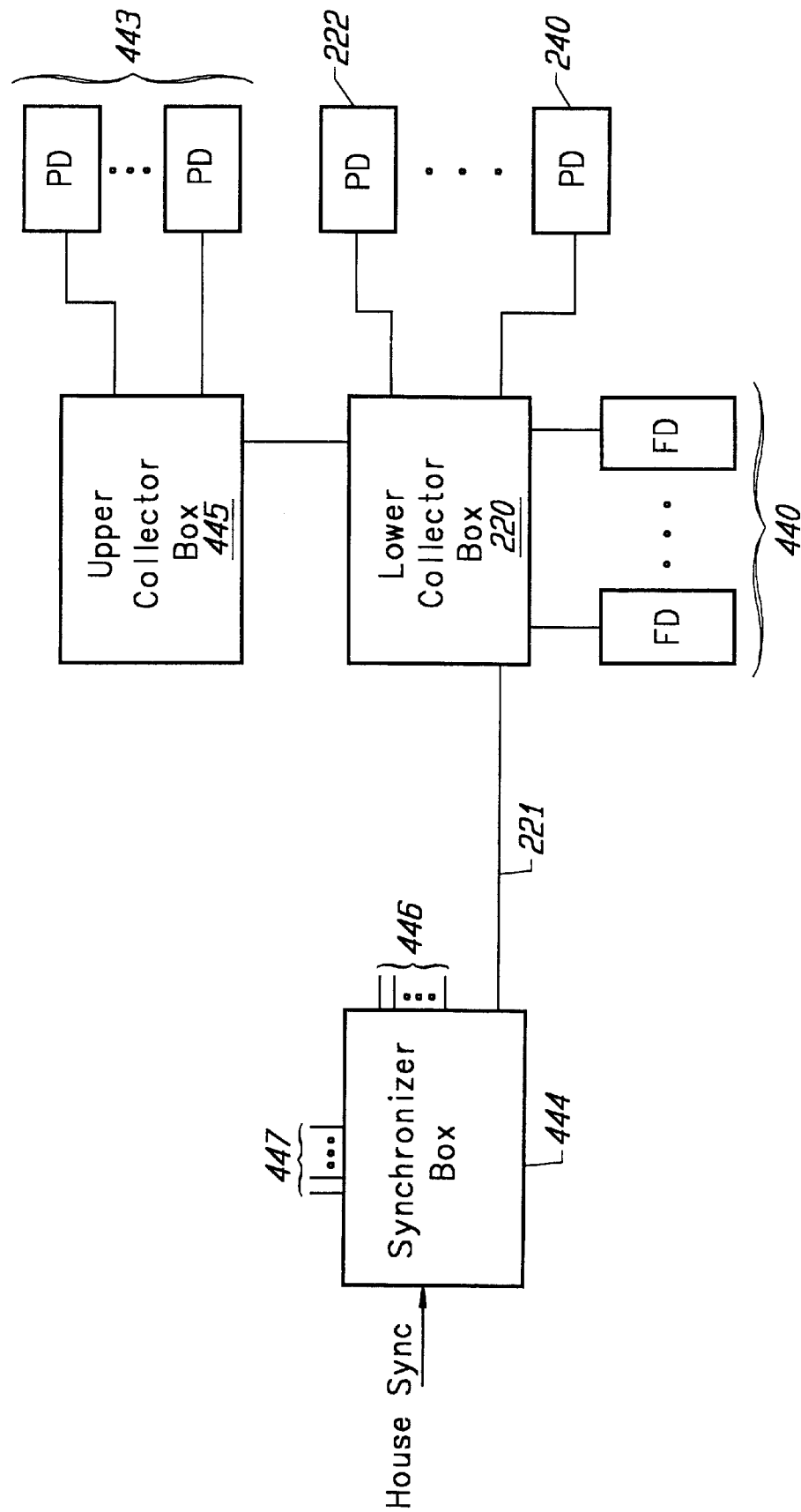
FIG. 12 is a block diagram of the pulse detection system and strobe flash detection system.

FIG. 12 shows a pulse detection system, which is one type of a synchronization system that can be used to synchronize the sensors with the object being tracked. Lower collector box 220 sends power to pulse detectors (222–240) and flash detectors (440) and receives a signal from pulse detectors 222–240 indicating a puck pulse. Alternatively, pulse detectors 222–240 can be self-powered. In addition to the pulse detectors arranged around the rink, the system can optionally include pulse detectors 443 above the rink (e.g. hanging from ceiling) or another location. Upper collector box 445 sends power to pulse detectors 443 and receives a signal from pulse detectors 443 indicating a pulse. Upper collector box 445 effectively wire-ORs the signals from pulse detectors 443 and sends the result to lower collector box 220. Collector box 220 effectively wire-ORs the output signals from the pulse detectors 220–240 and upper collector box 245 and sends the result to synchronizer box 440 which resides in graphics center 246. The system can include additional pulse detectors connected to additional upper collector boxes. Each upper collector box would have an output which is connected as an input to another collector box to be wire-OR'ed with the pulse detectors of the other collector box.

Lower collector box 220 receives a signal from each of the flash detectors 442 and effectively wire-ORs the signals. If any of the flash detectors 442 sense a flash, collector box 220 will ignore any pulses detected during the same time period as the flash. Thus, flash detectors 440 are a second (and optional) flash detect system in addition to the flash detectors at the camera locations.

Synchronizer box 444 receives the puck pulse signal on line 221 from lower collector box 220. Based on the signal from the pulse detectors, synchronizer box 444 determines the period of the puck. Synchronizer box 444 sends to each infrared sensor location and camera location a signal 446 which is used to synchronize the shutter of the infrared sensors.

Figure 13:
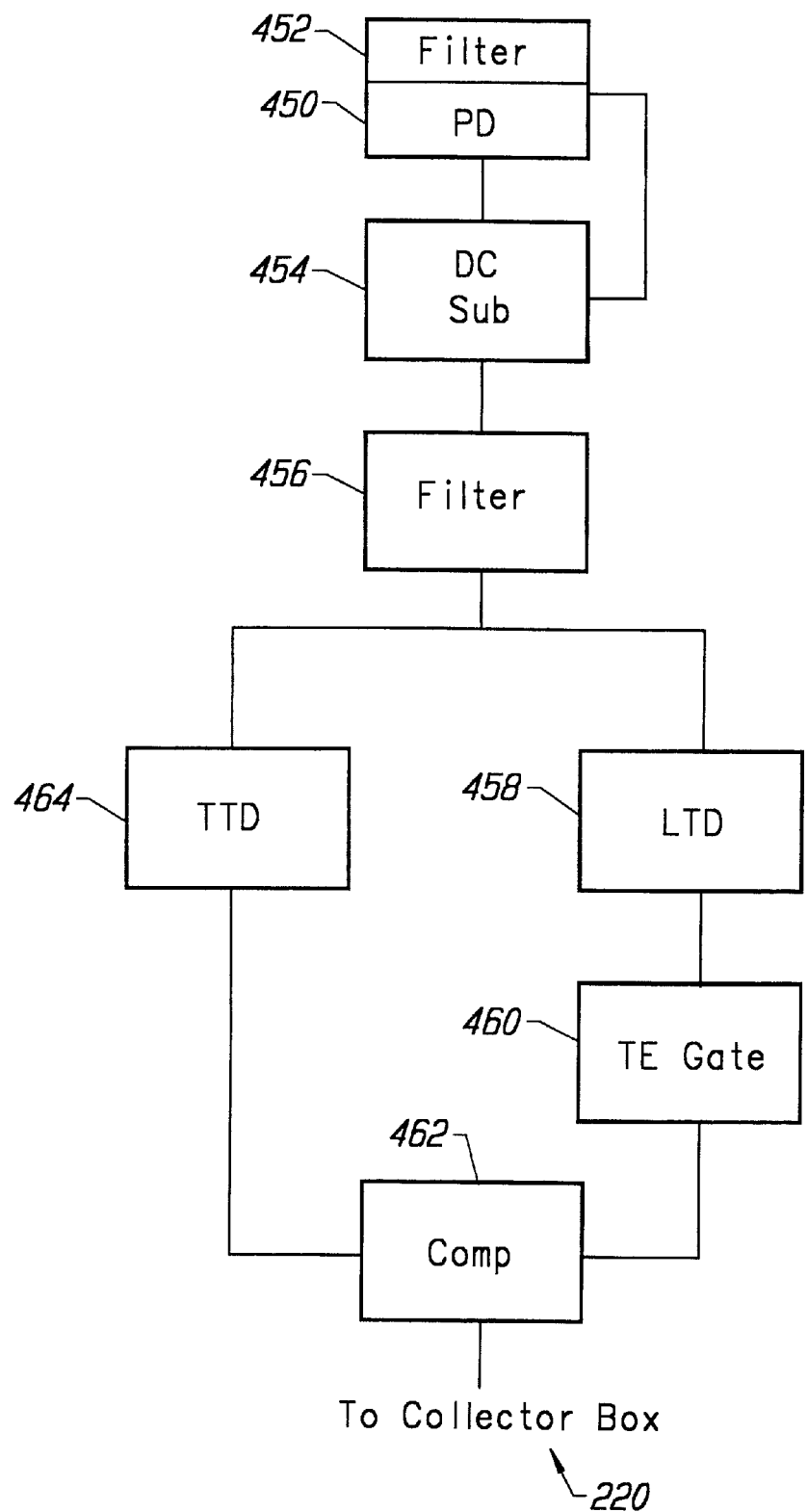
FIG. 13 is a block diagram of a pulse detector.

FIG. 13 shows a block diagram of a pulse detector. The heart of the pulse detector is a photodetector 450 which includes a photo diode and op-amp. In front of the photodetector is an infrared filter 452. Photodetector 450 is also connected to DC subtraction circuit 454. FIG. 13 shows two connections between photodetector 450 and DC subtraction circuit 454 to indicate that DC subtraction circuit 454 provides feedback to the op-amp in photodetector 450. The output of DC subtraction circuit 454 is sent to filter 456 which reduces steady DC signals and low frequency AC signals such as 120 Hz power line modulation. The output of filter 456 is sent to leading edge threshold detector 458, which detects the rising edge of the infrared pulse from puck 10. Connected to leading edge threshold detector 458 is trailing edge gate 460 which outputs a pulse when leading edge threshold detector 458 detects a leading edge. The output of tailing edge gate 460 is transmitted to comparator 462. Filter 456 also transmits its output to trailing edge threshold detector 464 which detects the falling edge of a pulse from puck 10. The output of trailing edge threshold detector 464 is transmitted to comparator 462. Comparator 462 determines whether a trailing edge was detected within the pulse created by trailing edge gate 460. If so, comparator 462 outputs an indication that a puck pulse has just occurred. Flash detectors 440–442 are similar to the pulse detectors except that the narrow band infrared filter 452 is replaced with a filter that allows detection of signals in a wide spectrum that includes signals emitted by puck 10.

Figure 14:
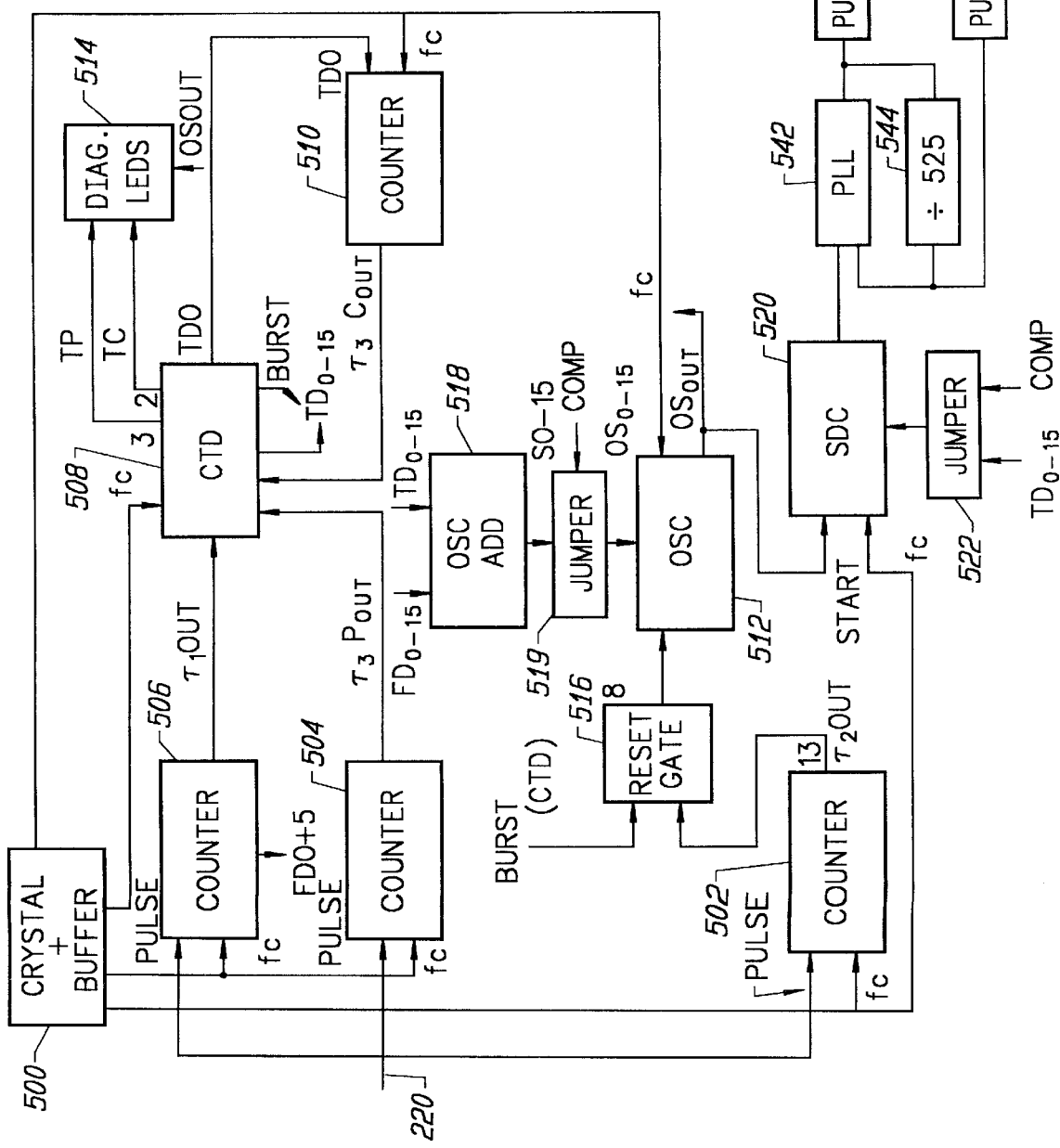
FIG. 14 is a block diagram of the synchronizer box of FIG. 12.

FIG. 14 is a block diagram of synchronizer box 444. Reference oscillator and buffer 500 includes an oscillator operating at 14.31818 MHz (70 nsec clock resolution) and a buffer. This circuit provides timing for circuits 502, 504, 506, 508, 510, 512, and 520. Circuit 502 is an adjustable counter that nominally provides a delay of 4095 clock pulses (286 μsec). Circuits 504 and 510 are fixed counters that provide delays of 4092 clock pulses each (285.8 μsec). Circuit 506 is an adjustable delay counter that nominally provides a delay of 7675 clock pulses (536 μsec). Circuits 502, 504, and 506 are started by the pulse detect signal 221. The difference in time delay between counter 506 and counter 502 is used to control the infrared sensor shutter timing in response to the pulse detect signal 221 so that the shutter opens just before a pulse from puck 10 occurs.

The delayed pulse from counter 506 starts counter timer 508. The output of counter timer 508 starts counter 510. The outputs of counters 504 and 510 are pulses with a width of 4092 clock pulses (285.8 μsec) each. In normal operation, the delays provided by the adjustable counter 506 and counter 508 are equal to the period of pulse 221 (approximately 30 Hz). The period of counter 508 counts an adjustable delay based on a user setable switch and an up/down counter/adder circuit inside counter timer 508 controlled by the output of counters 504 and 510. The count of the up/down counter is determined by the relative overlap positions twenty five to provide a 30 Hz reference signal that is compared to the output pulse from counter 520, thus controlling the frequency of phase-locked loop 542. Pulse generator 546 receives the output of phase-locked loop circuit 542 and generates approximately 10 μsec wide pulses. Pulse generator 548 generates a pulse approximately 30 μsec wide from the nominally 30 Hz rate out of divider 544. The outputs of circuits 546 and 548 are combined in "OR" circuit 560 and buffered by circuits 562 to provide a "composite sync" signal to the infrared sensors. The composite sync signal contains both a horizontal drive signal (the output of pulse generator 546) and a camera shutter control (the output of pulse generator 548). This composite sync signal is sent to the infrared sensors and decoded by sensor interface box 320.

One alternative to using pulse detectors is to include a receiver (e.g. RF receiver) in the puck. A control transmitter (e.g. similar to that described below) can send a signal to the puck commanding the puck to pulse. The central transmitter would also send a-synchronization signal to cause the infrared sensors to open their shutters.

E. Graphics Truck

Figure 15:
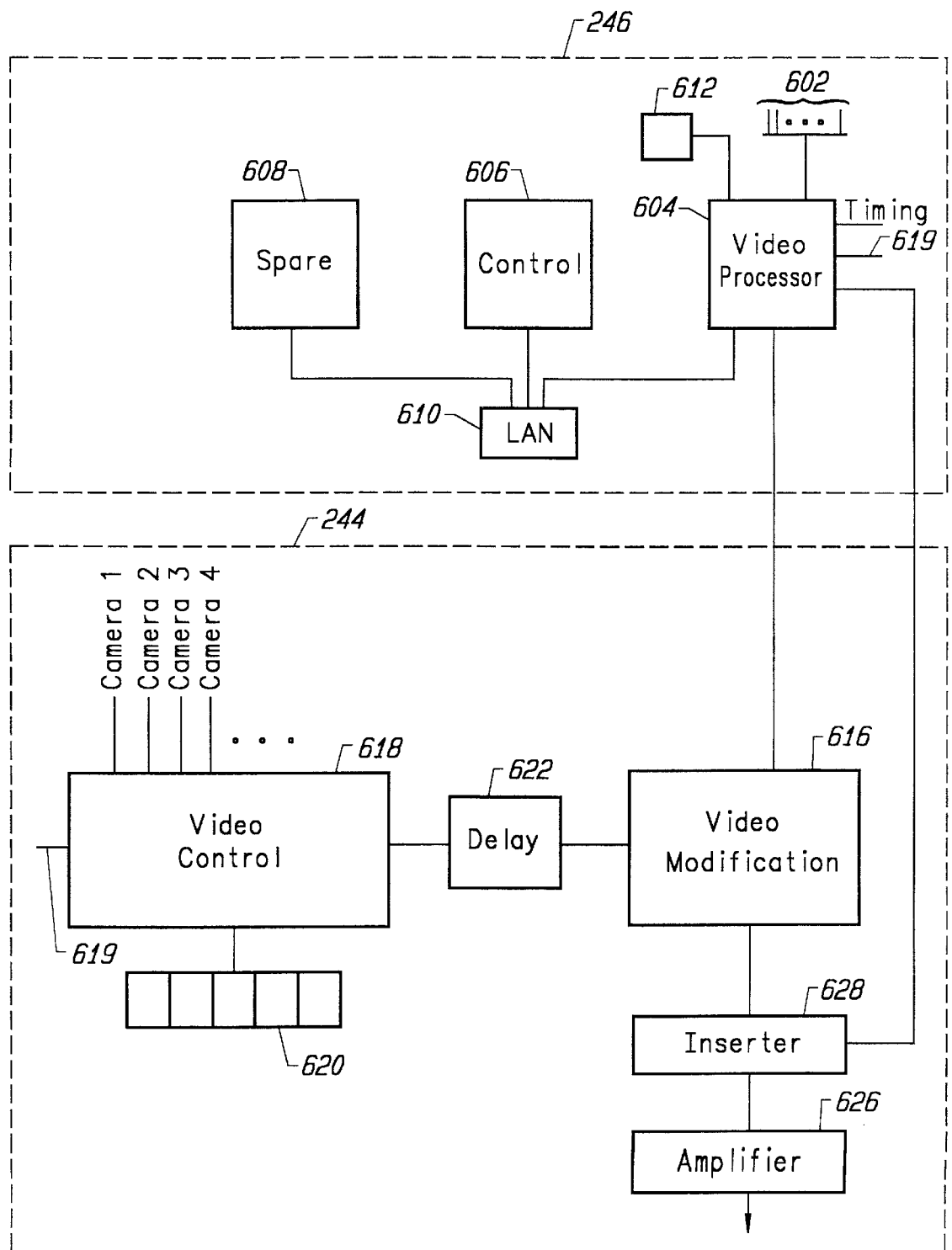
FIG. 15 is a partial block diagram of the graphics center and production center.

FIG. 15 shows a partial block diagram of graphics center 246 and production center 244. Graphics center 246 includes a video processor 604 which receives data 602 from processor 302 at each of the camera locations and infrared sensor locations. Video processor 604 performs the calculations to determine the location of the puck in the arena as well as the position of the puck in the video frame of a broadcast camera. The preferred video processor 604 is an Indigo Two Impact from Silicon Graphics. Video processor 604 receives cluster data for all of the infrared sensors and pan/tilt/zoom data for all of the broadcast cameras and saves that data in memory 612 along with timing information. The timing information is stored so that if the data is used at a later time, the processor can determine at what time the data was detected. Memory 612, in conjunction with disk drives, also stores software used to program processor 604.

Graphics center 246 also includes a control station 606 which is a second computer used as an operator interface. Control station 606 enables the operator of graphics center 246 to change variables (e.g. THRESHOLD), start the system and perform control functions. Graphics center 246 also includes a spare computer 608 which can be used in case either control station 606 or video processor 604 malfunction. Graphics center 600 can function with one computer. All three computers, 604, 606 and 608, communicate with each other over a local area network 610, which is a 10 Base-T implementation of ethernet. Each computer is connected to a Starbase T-9, 10 Base-T hub with twisted pair wiring.

After video processor 604 determines the location of puck 10, video processor 604 determines the position of the puck in the video frame of the broadcast camera. Video processor 604 then creates data which is sent to a video modification unit 616.

Many cameras are used to televise a sporting event. The video signals from all of the cameras are sent to video control 618 which is used to select one broadcast camera for transmission to viewers. One embodiment of video control 618 includes a plurality of monitors, one monitor for each video signal, and a selection circuit. A director (or manager) would monitor the different video signals and choose which signal to broadcast. The choice will be communicated to the selection circuit which selects one camera signal to broadcast. The choice is also communicated to video processor 604. The selected video signal is sent to delay 622. The output of delay 622 is transmitted to video modification unit 616. The purpose of delay 622 is to delay the broadcast video signal a fixed number of frames to allow time for video processor 604 to receive data and determine the position of the puck in the video frame. In the embodiment of FIGS. 7–19, the video frame needs to be delayed five frames. Additional delay can be added to allow for interpolation of missed data, as discussed below. Additionally, the hardware and the software can be modified to increase the speed of the video processing which would decrease the delay. Although the video is delayed a small number of frames, the television signal is still defined as live. The delay introduced by the system is a small delay (under one second) which does not accumulate. That is, successive frames are continuously enhanced with the same small delay. For example, a ten frame delay is equivalent to one third of a second, which is not considered a significant delay for television.

Video modification unit 616 modifies the video signal from delay 622 with the data/signal from video processor 604. The type of modification can vary depending on the desired graphic. One exemplar implementation utilizes a linear keyer as video modification unit 616. When using a keyer the signal from video processor 604 to the keyer includes two signals YUV and an external key (alpha). The YUV signal is called foreground and the signal from delay 622 is called background. Based on the level of the external key, the keyer determines how much of the foreground and background to mix to determine the output signal, from 100% foreground and 0% background to 0% foreground and 100% background, on a pixel by pixel basis.

As an option, the system can also include a data inserter 628 for inserting nonvideo data into a television signal. Nonvideo data is information other than the traditional data used by a television to draw the normal scan lines on a television display. An example of nonvideo data is data transmitted during the vertical blanking interval, which can be closed caption data, statistics regarding puck 10 (e.g. the puck's location, speed, acceleration etc.), interactive queries or internet addresses. In FIG. 15, inserter 628 receives a television signal from video modification unit 616 and nonvideo data from video processor 604, via signal 630. Inserter 630 inserts the nonvideo data into the vertical blanking interval of the television signal and sends the resulting signal to amplifier 626. Inserter 630 is a standard data inserter known in the art. One example of a suitable data inserter can be found in PCT International Patent Application Number PCT/US94/13484, which was published on Jun. 8, 1995 with International Publication Number WO 95/115654, which is incorporated herein by reference.

FIG. 16 describes some of the operations in graphics center 246 and processing center 248. In step 640, the pan, tilt and zoom data is received by video processor 604 from the various processors (e.g. processor 302). In step 642, cluster data is received from the processors (e.g. processor 302). In step 644, video processor 604 stores the pan/tilt/zoom information for all broadcast cameras and the cluster data in memory 612. In step 648, video processor 604 determines the three dimensional location of puck 10. In step 650, the system removes false detections. As discussed above, there are various means for removing false detections, some of which can be performed both by a processor at the graphics center. Preferably, region of the play filters and exclusion zones are accomplished at the graphics center, although the inventors do contemplate performing variations of these methods at sensor locations.

Exclusion zones are known areas of false data. For example, there may be a camera with a light near the arena, or any other light near the playing surface (e.g. light indicating a penalty, timeout, etc.). It is possible for these lights to emit an infrared signal. Since the existence and locations of these sources are known, they can be removed from the data considered by the video processor in determining the three-dimensional location. One method for ignoring an exclusion zone is after determining the three-dimensional location of the puck, if that location is in an exclusion zone, then ignore that location data. For example, in some instances, the system determines one or more possible locations of the puck. If any of these locations are in the exclusion zone, that location is removed from consideration. Alternatively, the video processor can ignore all lines of position that pass (or substantially pass) through an exclusion zone. Another alternative includes the electronics at the sensor ignoring any cluster that would give rise to a line of position into an exclusion zone. Another alternative includes manually entering all exclusion zones for each sensor that is fixed (e.g. no pan or tilt) before the sporting event begins. This can be done at graphics center or the central location. If a sensor can pan or tilt, the processor at the sensor can be given the three-dimensional location. Exclusion zones can also be defined in two dimensions for a camera or sensor. The exclusion zone can be manually entered at one of the processors or an operator in the production center can identify the exclusion zone using an input device (e.g. mouse) in connection with a monitor (video or sensor data).

Field of play filters are software methods for ignoring data that indicate a location outside the field of play. For example, prior to the sporting event, the system can be programmed with the three-dimensional coordinates of the hockey rink, for example, the X and Y coordinates of the hockey rink and a Z axis height limit (e.g. twenty feet). Any data indicating a location of the puck outside of these limits will be ignored.

In step 652, video processor 604 determines the puck's position in the video frame of the selected broadcast camera. In step 654, the television presentation of the selected broadcast camera is enhanced. In one embodiment, the enhancement includes video processor 604 creating a frame of data with a graphic at the position of the puck in the video frame of the broadcast camera. The frame of data created by video processor 604 is sent to video modification unit 616 which combines the frame of data sent from video processor 604 with the frame of data from the selected broadcast camera. In step 656, the enhanced video frame is transmitted for broadcast or stored for later use.

The graphic could be a larger puck, a flashing puck, an icon, a trail of fire, an opaque cloud on top of the puck, any combination thereof, or any other graphic which highlights the video presentation of the puck. The graphic could also be logically near the position of the puck, for example, a trail of fire behind the puck, a trajectory of the puck's path, a target at the end of the pucks trajectory, an arrow pointing to the puck, etc. The enhancement could also include audio data, for example, a sound related to the speed or acceleration of the puck, or a sound indicating that the puck is at the certain location. Other examples of enhancements includes nonvideo data; statistics displayed on the television related to the puck's position, location, speed, acceleration, etc. The step of enhancing includes combining data (e.g. a keyer), editing data and creating data.

Figure 17A:
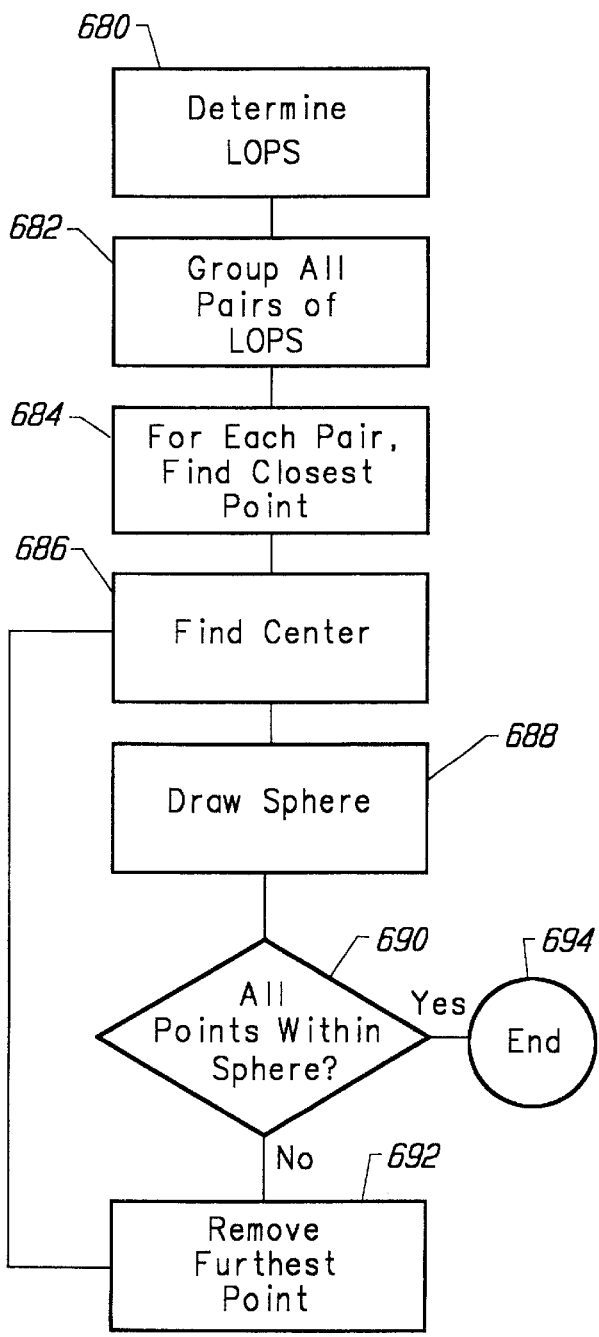
FIGS. 17A and 17B are flow charts describing two exemplar methods for determining the puck's three dimensional location.
Figure 17B:
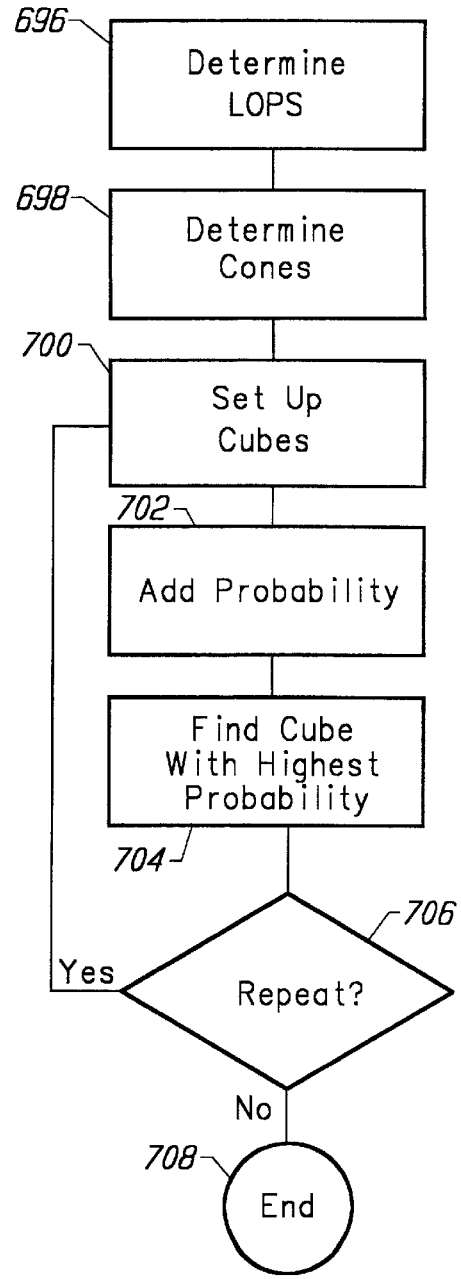

FIG. 17A is a flow chart explaining the determination of the puck's three dimensional location (step 648 in FIG. 16). There are many suitable ways for determining the three dimensional location of the puck using the available data described above. One alternative involves determining lines of position. Once lines of position are known, there are many suitable methods to determine three dimensional location. FIGS. 17A and 17B explain two exemplar methods.

In step 680 of FIG. 17A, video processor 604 determines a line of position (LOP) for each cluster of each sensor. Thus, if there are twenty clusters transmitted to video processor 604, twenty LOPs are determined. The LOP is first calculated in "camera space", the coordinate system where the infrared sensor is at the origin looking along the negative Y axis, with the X axis on the right and the Z axis up. The LOP is then transformed into the three dimensional coordinate system of the arena.

In order to calculate the LOP in camera space, the sensor focal length and aspect ratio are measured in advance on an optical bench. This measurement indicates that a target a meter away if moved one pixel to the side moves h meters in space, and if moved one scan line up or down, moves v meters in space. From these ratios, given that the cluster is x pixels and y scan lines from the center of the sensor field of view, a vector is constructed:

$$V=(x*h, y*v, 1.0)$$

A line of position is represented as a point and a vector:

$$LOP=P,V$$

A point in three dimensional space is represented by a 4 element row vector: (x, y, z, 1.0). The 1.0 (sometimes called w) allows for translation. In camera space, point P is (0,0,0,1.0) since the sensor is at the origin. The LOP is a parametric representation of a line, since any point on the line can be represented as:

$$p=P+k*V, \text{ k is a scalar.}$$

An LOP is transformed into the three dimensional coordinate system of the arena by a 4×4 matrix. The three element vector is multiplied by the inverse transform of the upper left 3×3 matrix of the 4×4 matrix. The four element point is multiplied by the 4×4 matrix.

For an infrared sensor rigidly mounted separate from a broadcast camera, the vector component of the LOP is transformed by the matrix (J):

$$J=TYPR,$$

where, $$T = \begin{bmatrix} 1 & 0 & 0 & 0 \\ 0 & 1 & 0 & 0 \\ 0 & 0 & 1 & 0 \\ -x & -y & -z & 1 \end{bmatrix}$$

$$Y = \begin{bmatrix} \cos yaw & -\sin yaw & 0 & 0 \\ \sin yaw & \cos yaw & 0 & 0 \\ 0 & 0 & 1 & 0 \\ 0 & 0 & 0 & 1 \end{bmatrix}$$

$$P = \begin{bmatrix} 1 & 0 & 0 & 0 \\ 0 & \cos pitch & -\sin pitch & 0 \\ 0 & \sin pitch & \cos pitch & 0 \\ 0 & 0 & 0 & 1 \end{bmatrix}$$

$$R = \begin{bmatrix} \cos roll & 0 & \sin roll & 0 \\ 0 & 1 & 0 & 0 \\ -\sin roll & 0 & \cos roll & 0 \\ 0 & 0 & 0 & 1 \end{bmatrix}$$

Since the infrared sensor is in a fixed position, the yaw, pitch and roll can be measured during the registration process.

For infrared sensors mounted on a broadcast camera the transformation matrix (M) is:

$$M=XABCDO$$

$$X=TYPR$$

The matrix (X) models the fixed position and orientation of the broadcast camera. The matrices (ABCD) model the movement of the broadcast camera (e.g. pan, tilt, etc.). The matrix (O) has the same form as the matrix (X) and models the positional and rotational offset of the infrared sensor from the top surface of the camera head.

$$A = \begin{bmatrix} \cos pan & -\sin pan & 0 & 0 \\ \sin pan & \cos pan & 0 & 0 \\ 0 & 0 & 1 & 0 \\ 0 & 0 & 0 & 1 \end{bmatrix}$$

$$B = \begin{bmatrix} 1 & 0 & 0 & 0 \\ 0 & 1 & 0 & 0 \\ 0 & 0 & 1 & 0 \\ 0 & -forward & 0 & 1 \end{bmatrix}$$

$$C = \begin{bmatrix} 1 & 0 & 0 & 0 \\ 0 & 1 & 0 & 0 \\ 0 & 0 & 1 & 0 \\ 0 & 0 & -tiltrise & 1 \end{bmatrix}$$

$$D = \begin{bmatrix} 1 & 0 & 0 & 0 \\ 0 & \cos tilt & -\sin tilt & 0 \\ 0 & \sin tilt & \cos tilt & 0 \\ 0 & 0 & 0 & 1 \end{bmatrix}$$

$$F = \begin{bmatrix} 1 & 0 & 0 & 0 \\ 0 & 1 & 0 & 0 \\ 0 & 0 & 1 & 0 \\ 0 & -povdist & 0 & 1 \end{bmatrix}$$

$$E = \begin{bmatrix} 1 & 0 & 0 & 0 \\ 0 & 1 & 0 & 0 \\ 0 & 0 & 1 & 0 \\ 0 & 0 & -axisheight & 1 \end{bmatrix}$$

Pan and tilt angles are measured with the pan and tilt sensors 288 and 290. The forward offset distance (forward) is the distance that the tilt axis is positioned forward of the pan axis. The forward offset distance and optical axis height (axisheight) can be measured directly from the camera head with a ruler. The tilt rise, which is the distance from the nominal position that the camera plate rises, can also be measured with a ruler and a lookup table built as a function of tilt angle. The POV (povdist) (or First Principal Point, or Front Nodal Point) is the position of the camera's virtual point of view measured as a distance forward of the tilt axis when the camera is in the horizontal position. The POV can be measured on an optical bench and a lookup table built as a function of zoom position, focus, and 2× setting. The POV is measured by placing two targets in the field of view of the lens, off-center, one farther away than the other, so they appear in line through the viewfinder. Where a line extended through those targets intersects the optical axis of the camera is the position of the virtual POV. The effective horizontal and vertical focal length of the lens ($f_h$ and $f_v$) are the half-width and -height of the camera's field of view at some distance divided into that distance. This is measured on the optical bench and a lookup table built as a function of zoom position, focus, and lens doubler. The aspect ratio is $f_h/f_v$ and is constant, so usually $f_v$ is modeled for given settings and $f_h$ is equal to aspect multiplied by $f_v$.

After a line of position is determined for every cluster, video processor 604 groups all possible pairs of LOPs (step 682). For each pair of LOPs, video processor 604 finds the closest point of contact of the two LOPs (step 684). If the LOPs do not intersect the closest point of contact will be two points, one on each LOP. The line connecting the two points is perpendicular to both LOPs. To simplify the calculations, one embodiment contemplates using the midpoint of the line perpendicular to both LOPs as the closest point of intersection. However, both points can be used in the steps described below.

At the end of step 684, video processor 604 now has a set of points of closest contact. In step 686, video processor 604 finds a center of all of the points of closest contact. The center is the average of the coordinates of the points of closest contact. In step 688, video processor figuratively draws a sphere around the center point. The radius of the sphere is predefined. The radius should be big enough to allow the system to function, but small enough so that improper data is thrown out. In one embodiment, the radius is set as one meter. Each time the system is set up, a user may need to use trial and error to determine the proper radius. In step 690, video processor 604 determines whether all the points fit within the sphere. If not, video processor 604, in step 692, removes the furthest point and loops back to step 686. If all the points do fit within the sphere, then the average or center of the sphere is a candidate for the three-dimensional location of puck 10. One alternative is to reduce the radius for each iteration, keep iterating until the minimum radius is reached (e.g. 0.1 meter) and if there are a predefined number of points remaining (e.g. $\geq 2$) then a valid three dimensional location candidate had been found. Another alternative includes reducing the radius for each iteration, removing all points outside the sphere for each iteration, continue iterating until the minimum radius is reached (e.g. 0.1 meter) and if there are a predefined number of points remaining (e.g. $\geq 2$) then valid three dimensional location candidate has been found. The points of closest contact may form more than one separate groups of points, in which case the method of FIG. 17A can be repeated for each group of points and more than one location candidate will be determined. The incorrect candidates should be removed when removing false detections in step 650 of FIG. 16.

Another method for determining a free dimensional location based on lines of position is based on the probabilities of finding the puck at certain locations along or near the lines of position. FIG. 17B describes one exemplar method for using lines of position and probabilities to determine dimensional location. In step 696, lines of position are determined for each cluster of each sensor. In step 698, the system determines cones for each line of position. That is, each line of position can be thought of as a set of cones, one inside the other. Each cone represents a space with an assigned probability for the puck being within that space. The set of cones is projected onto the playing surface. In step 700, a set of cubes are figuratively created. A first layer of cubes lie on the playing surface. A second layer of cubes are located above the first layer, and so on. Each cone is projected such that it passes through one or more cubes. For each line of position, each cube is assigned a probability equal to the probability of the cone passing through the cube. If more than one cone for a particular line of position passes through a cube, the cube is assigned the probability of the highest probability cone passing through it. If a cube lies within cones from more than one line of position, a cube will be assigned more than one probability. Each of the probabilities assigned to each cube are added and the sum is stored for each cube (step 702). If a cube was assigned only one probability, then that one probability is the stored sum. The cube with the highest probability sum is assumed to be the cube where the puck is (step 704). In one embodiment, the cubes are small enough so that the resolution of the cube is sufficient to find the puck in one iteration. In one alternative, the playing surface is divided into a small set of large cubes and step 704 determines which of the large cubes the puck lies in. Since the resolution of the cubes is not fine enough for the puck determination to be accurate, the process is repeated (in step 706) by looking back to step 700, dividing the one cube which contains the puck into smaller cubes, the probability is added up for the smaller cube and the system determines which of the smaller cubes contains the puck. If the resolution of the small cube is sufficient, the method ends; otherwise, the method performs another iteration. The inventors contemplate numerous other equivalent implementations that make use of the probability of the puck's location that are within the spirit of the present invention.

FIG. 18 is a flow diagram describing one exemplar embodiment of how video processor 604 determines the position of the puck in the video frame of the selected broadcast camera and creates data which is sent to video modification unit 616. In step 710, video processor 604 transforms the three dimensional location of the puck to a two dimensional position in the video frame of the selected broadcast camera. A broadcast camera is represented mathematically by a 4×4 matrix which includes details of position and orientation. The three dimensional point is transformed into a two dimensional normalized frame location by multiplying the point by the camera matrix (K). The camera matrix (K) in its simplest form is a combination of rotation, translation, and perspective elements, all of which are represented by 4×4 matrices. In reality, the motion of the camera point of view (POV) is much more complicated with offsets caused by the mounting of the camera on the tripod and the motion of the optical POV along the camera's optical axis due to lens characteristics. All these effects can be modeled as more complex linkages (additional matrices) between the fixed camera base and the resulting POV of the camera as the camera is moved through its range of controls. These techniques are well-known in the art.

In the disclosed embodiment, the broadcast camera is modeled as a 4×4 matrix which includes two parts—a fixed transformation (X) which represents the position of the camera in the arena and its orientation, and a variable transformation (V) which varies with changes in pan angle, tilt angle and the zoom:

$$K = XV$$

The fixed transformation matrix (X) models x, y, z position as well as fixed yaw, pitch and roll representing the camera's mount orientation:

$$X = TYPR$$

The variable transformation matrix (V) models not just the pan and tilt rotations, but also the complicated way the POV of the camera moves as it pans, tilts, and zooms. For a camera used with a Vinton Vector 70 camera head and a Canon J55 Super lense, the variable transformation is modeled in seven parts (matrices):

$$V = ABCDEFG$$

$$G = \begin{bmatrix} f_h & 0 & 0 & 0 \\ 0 & f_v & 0 & 0 \\ 0 & 0 & -(f+n)/(f-n) & -1 \\ 0 & 0 & -2fn/(f-n) & 0 \end{bmatrix}$$

The variables n and f are the distances to the mathematical near and far clipping planes; which are only important in assigning a useful range for z-buffered graphics drawing; therefore, nominal values are used of n=1 meter and f=100 meters.

The form of all seven matrices are defined above. Matrix (A) models the camera's pan on its fixed base. Matrix (B) models the tilt axis as a fixed distance forward of the pan axis. Matrix (C) models the tilt axis as a variable distance above the plane of the top of the tripod—the camera is raised as it tilts away from horizontal to counteract the tendency for it to flop forward or backward. The rise is a function of tilt. Matrix (D) models the camera's tilt angle. Matrix (E) models the optical axis of the lens as some fixed distance above the tilt axis. Matrix (F) models the lens moving forward and backward along the optical axis of the lens as a function of zoom. Matrix (G) models the effective focal length of the lens as a function of zoom, focus, and lens doubler (2×) settings.

In step 712 of FIG. 18, the graphic (if any) is scaled for the field of view of the broadcast camera. The field of view of the broadcast camera, based on location, pan, tilt and zoom, determines how big the puck should be in the video frame. In step 714 video processor draws a black window and then places a graphic at or near the location of the puck. In step 716, the window is sent to video modification unit 616.

The present invention system is capable of performing look ahead processing. That is, due to frame delays, one embodiment of the present system can look at video frames and accompanying data for frames captured after the current frame being processed. This information can be used to enhance the processing at the current frame. One example of look ahead processing is interpolation.

Figure 19:
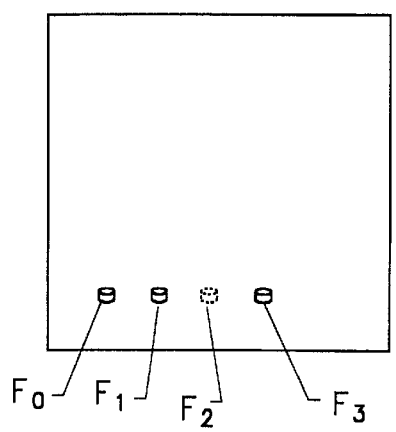
FIG. 19 shows the hockey puck in a video frame at four moments in time.

During operation, video processor 604 may not receive data for a particular video frame of the broadcast camera. In such a situation, if only one or a small number of frames of data are lost, it is possible that video processor 604 can interpolate the location or position of the puck so that the enhancement of the television presentation of puck 10 will be continuous. For example, FIG. 19 shows a symbolic video frame which includes four images of puck 10 superimposed on the same frame. $F_0$ signifies the location of the puck during frame 0. $F_1$ signifies the location of the puck during frame 1. $F_2$ represents the location of the puck during frame 2, and $F_3$ represents the location of the puck during frame 3. However, during frame 2, video processor 604 did not receive any data and, thus, interpolates the position of puck 10 during frame 2. Therefore, the puck is dotted for $F_2$.

FIG. 20 describes the process of interpolating the location of the puck. In step 730, the pan/tilt/zoom data is received. In step 732, video processor 604 attempts to receive cluster data, similar to step 642 in FIG. 16. Since no useful cluster data is transmitted, video processor 604 waits for the next video frame of data. Step 734 includes steps 640–650 (or 640–652) of FIG. 16. After the location of the puck is determined for the next video frame, video processor 604 considers the location of the puck before and after the lost video frame in order to interpolate where the puck should have been during the lost video frame (step 736). As discussed above, before a broadcast frame of data is sent to video modification unit 616 it is delayed five frames. In order to interpolate for one frame of lost data, video processor 604 needs to wait for an extra frame of data. This extra delay is added to the five frame delay discussed above. Thus, the total delay is six frames. If video processor 604 interpolates for five frames of data, then it needs five extra frames of data for a total delay of ten frames, and so on. Thus, under the current system, if video processor 604 can interpolate for N frames of lost data then the broadcast camera video frames must be delayed (e.g. at delay 622) five plus N frames. After the system interpolates to find the position of the puck, the video is enhanced (step 742) and transmitted (step 744).

One embodiment of the present invention contemplates video processor 604 adding nonvideo data to the television signal. FIG. 21 depicts additional hardware at the viewer's home which allows for additional enhancement for the television presentation based on the nonvideo data. Television signal 748 is received by television 750 via cable, a conventional antenna or any other suitable means. The signal can also be sent to a decoder 752 or computer 754. Computer 754 is in communication with decoder 752 and television 750. Decoder 752 uses technology known in the art to remove data from the vertical blanking interval of a television signal. In one alternative, the function of decoder 752 is performed by computer 754. Television 750 can also include a VCR or other videotape machine. Computer 754 includes a monitor 756 which displays windows (e.g. 758, 760, 762). When television signal 748 is received in the viewer's home, decoder 752 strips out the nonvideo data from the vertical blanking interval. Decoder 752 sends the data to computer 754 which can display the data in window 762. Video processor 604 can also be pre-programmed such that when certain events occur (e.g. relative to the location of the puck), video processor 604 inserts one or more addresses of web pages on the internet into the vertical blanking interval of the television signal. As decoder 752 strips out these addresses from the vertical blanking interval, computer 754 can display these addresses on window 762 and allow the user to click on the address with a mouse or use some other user input means which will cause software in the computer 754 (e.g. Mosaic or Netscape) to load the addressed web page.

In another alternative, a television signal is received at the viewer's home and is transmitted directly to computer 754. Computer 754 will then display a window 760 which would show the televised sporting event. In yet another alternative, a viewer can be provided with remote control capabilities. Video processor 604 can determine the position of the puck in the broadcast video frame but not enhance the broadcast video. The puck's position is inserted into the vertical blanking interval of the broadcast signal and sent to the viewer's home. Decoder 752 strips out the location of the puck from the vertical blanking interval and sends the location to computer 754. Computer 754 also receives the video signal and displays the sporting event in window 760. Computer 754 includes software to add a graphic overlay at the position of the puck in window 760. Window 758 could be used as a user interface to allow the viewer to turn on or off the enhancement of the puck or to choose what enhancements should be made. In a further alternative, instead of displaying the enhanced video in window 760, computer 754 can send the enhanced video to television 750. The software used to program computer 754, and all of the software described above, can reside in memory, on a disk or any other computer readable medium.

F. Registration

The registration process includes initializing the system. As discussed above, at least one embodiment of the system determines the three dimensional location of the puck. Since location is relative, the system needs a reference point. Thus, the first step is to establish a coordinate system, which is accomplished by using X,Y,Z axes with the origin or center point (0,0,0) being at the center of the hockey rink. Three or more registration points (e.g. nine) are marked on the rink in addition to the center point. The distance from the center point can be measured for each registration point so that the coordinates of the registration points are known. The broadcast cameras and the sensors can be registered by solving for the unknown variables in the above described matrices.

Registering the broadcast camera involves the determination of the matrix (X). A broadcast camera is pointed at each registration mark in turn, centering the registration mark in the field of view using the center reference mark in the viewfinder. The pan and tilt angles are read and the variable part of the camera transform is calculated for each mark using an arbitrary constant zoom value. (Zoom is not a factor in these comparisons as each registration mark is centered in the field of view. Some constant value is used so errors of different registration marks can be directly compared.) An initial educated guess at the fixed transformation parameters (e.g. x, y, z, yaw, pitch, roll) is made and the fixed component matrix is calculated. For each registration point, the fixed matrix (X) is concatenated (multiplied) with the variable matrix (V) for each registration point to obtain the composite camera matrix. Then, the three dimensional location of the registration point is transformed by the composite camera matrix to a two dimensional position in the broadcast camera's video frame. An error is determined representing the distance from the calculated two dimensional position to the center of the video frame. The fixed transformation parameters are varied and the process is repeated until the error is minimized, at which point the camera is registered and the resulting fixed matrix (X) is used for subsequent calculations.

To register a stationary infrared sensor that is not mounted on a broadcast camera, infrared emitters are placed at the registration points. An initial educated guess is made at the parameter values for the transformation matrix (J) and the three dimensional locations of the registration marks are determined using matrix (J). An error is determined between the calculated locations (via the matrix) and measured locations of the registration marks. The parameters are varied and the process is repeated until the error is minimized, at which time the sensor is registered and the resulting matrix is used for subsequent calculations.

Registering a camera-mounted infrared sensor is the process of determining the matrix (O). First the broadcast camera on which the infrared sensor is mounted is registered (the X matrix is determined). Infrared sources are placed at the registration marks and the broadcast camera is oriented to give the sensor a view of the infrared sources. The pan and tilt angles are read and the ABCD matrices are calculated. Matrix (G) is calculated using the measured focal length of the sensor. Matrix (O) is the only undetermined part of the equation. A first educated guess is made at the matrix (O) parameters and the composite transformation matrix is calculated. The three dimensional locations of the registration marks are calculated using the transformation matrix and an error is determined between calculated location and the measured location of the registration marks. The parameters are varied and the process is repeated until the error is minimized, at which time the sensor is registered and the determined matrix (O) is used for subsequent calculations. Alternatively, the x, y, z offsets of the infrared sensor relative to the camera plate can be measured directly rather than solving for them. Measuring directly is generally more accurate.

As an alternative, the location and orientation of the broadcast cameras and sensors can be measured relative to the center location. A tape measure can be used to determine the position of the cameras and sensors, or the cameras and sensors can be surveyed.

G. Single Sensor System

The above described system determines the three dimensional location of the puck in order to enhance the video and/or audio for any broadcast camera whose pan/tilt/zoom and location are known. The inventors also contemplate a system that does not determine the three-dimensional location of the puck. Such a system could include one infrared sensors (or master-slave configuration) attached to or fixed near the broadcast camera. The video processor receives clusters from one infrared sensor and creates a line of position for one clusters. Various criteria can be used to determine the one cluster, for example, the brightest cluster. Since there are no clusters from other infrared sensors, a three dimensional location of the puck cannot be determined. Video processor 604 transforms the line of position from camera space to the three dimensional coordinate system of the arena. A point is selected along the line of position at a fixed distance from the camera, and that point is assumed to be the three dimensional location of the puck. Although the point is not the actual location, it will be in line with the actual location. If the system misses a frame of data, the video processor can interpolate in a manner similar to that described above. However, rather than interpolate the puck's three dimensional location, the video processor interpolates the puck's position in the video frame.

H. Replay

As shown in FIG. 15, the system includes replay decks 620 that can store video, with timing information, for short term use (instant replay) or long term use. Memory 612 stores the pan/tilt/zoom data for the broadcast cameras, data representing the location and/or position of the puck, and timing information. Alternatively, memory 612 can store the cluster information and the necessary parameters of the transformation matrices. Thus, the system stores all of the information necessary to enhance video subsequent to the live event. For example, between periods of a hockey game an announcer may wish to describe a particular play. The video for the play can be recalled from deck 620 and by matching the timing information, the corresponding data can be read from memory 612 and the system can perform all or part of the methods of FIGS. 16–20.

I. Alternative Use of Infrared Technology

The infrared technology disclosed above can be used in conjunction with the television presentation of sporting events other than hockey. For example, the infrared transmitter can be located within any suitable object at a sporting event as long as the transmitter does not interfere with the proper use of that object.

II. Radar with Active Transponder

An alternative to using infrared technology is radar. A radar based detection system relies on energy scattered or reflected back to the radar from an object of interest. In the hockey application, the energy scattered from a conventional puck can be lost in all the undesired back scattered energy (clutter) from the players, the rink, the building, etc. In order to make the puck stand out among the clutter, the radar signal is amplified with an electronic repeater. The puck's emission is made stronger and given a unique signature which makes it more easily detected.

Using radar with an active repeater to track a hockey puck has several desirable qualities. First, in addition to having inherently high ranging accuracy of a few inches or better, RF in the low microwave band efficiently passes through dielectric materials, such as hockey sticks and partially defracts around optically opaque objects such as ice skates, blades and human bodies. Thus, the puck is visible to the radar a substantial percentage of the time. Second, the repeater electronics are entirely confined within the rubber of the puck. Third, puck modulation can be channelized so that errant pucks lost in the crowd cannot be turned on and interfere with the active game puck. Additionally, an active repeater is preferred over a passive reflecting hockey puck because it provides a much higher signal to noise ratio, provides false Doppler data (a motionless puck can be detected) and can be used to track more than one object.

A. Puck with Active Transponder

Figure 22:
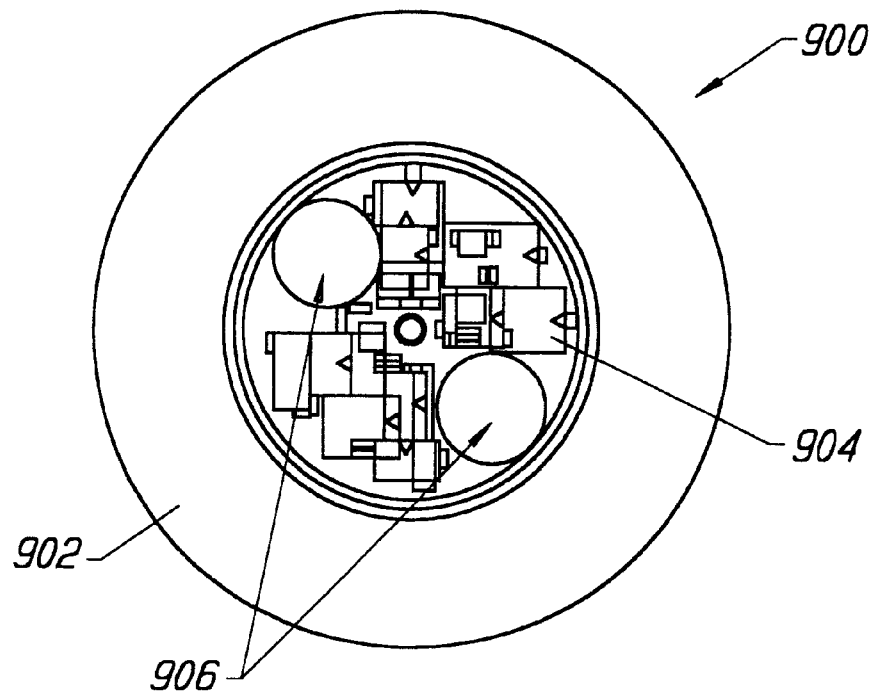
FIG. 22 is an elevational cut-away view of a second embodiment hockey puck with an active radar transponder.
Figure 23:
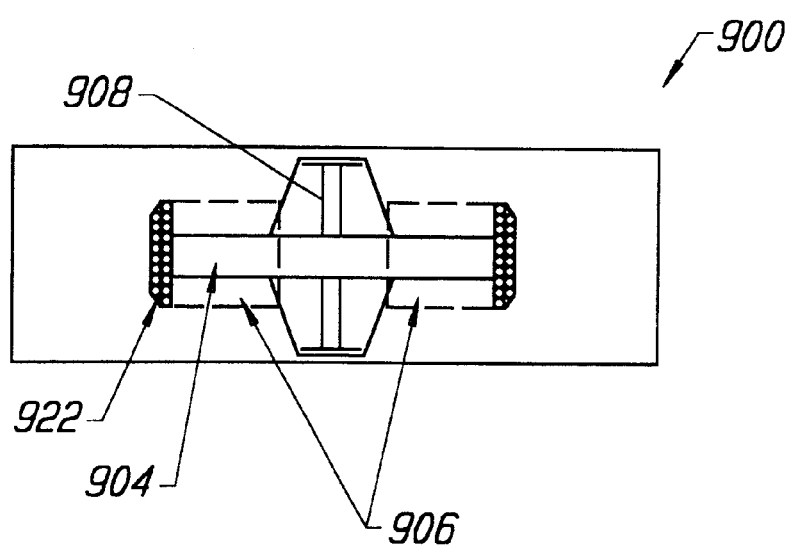
FIG. 23 is a cross-sectional view of the hockey puck of FIG. 22.

FIG. 22 shows hockey puck 900 to be used with a radar system. Completely embedded within rubber section 902 of puck 900 is radar repeater 904, which uses a gated repeater architecture. Repeater 904 receives, amplifies, modulates and retransmits the instant radar signal. FIG. 23 is a side cut-away view of puck 900 showing repeater 904 with batteries 906 and antenna 908. In the preferred embodiment of a hockey puck with an active transponder, batteries 906 includes two ⅓N lithium ion primary cells.

Figure 24:
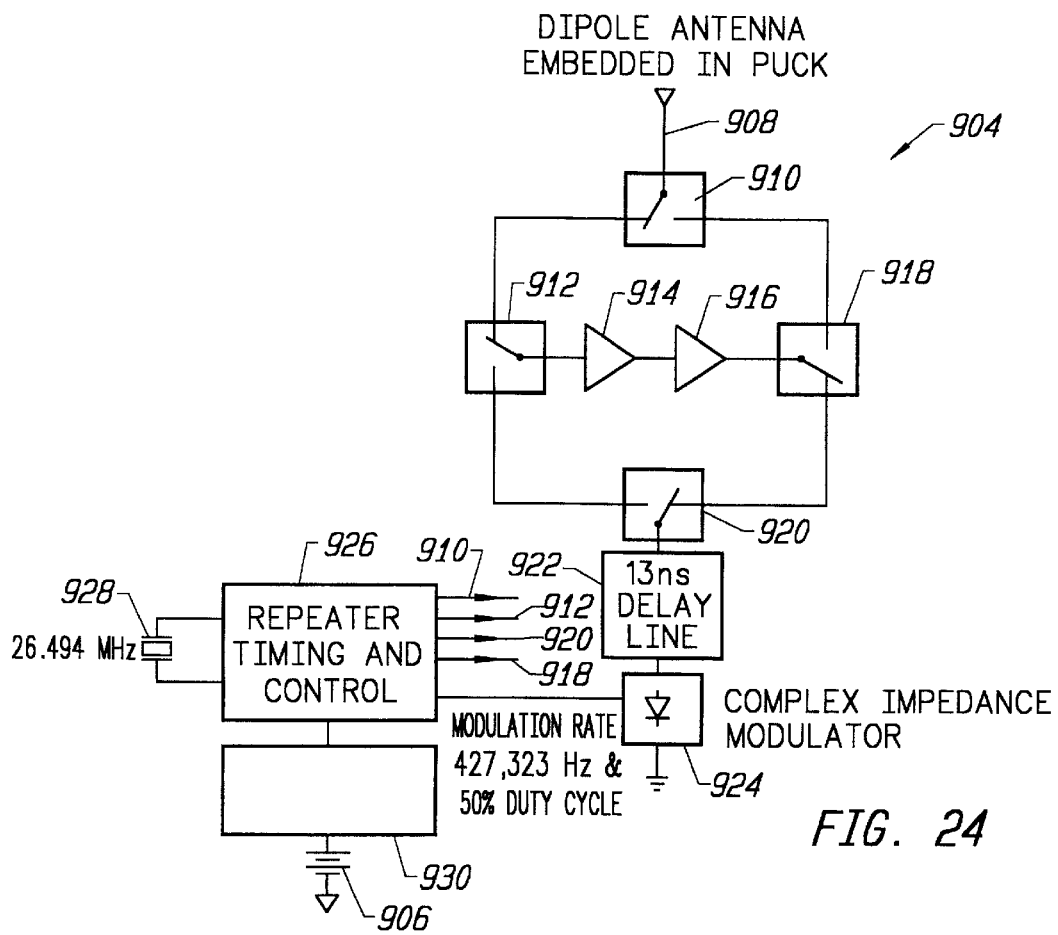
FIG. 24 is a block diagram of the electronics in the hockey puck of FIG. 22.

FIG. 24 is a block diagram of radar repeater 904. A signal is received by dipole antenna 908 (which is completely embedded in puck 900) and then passes through a switch and amplifier network. First, the received signal passes through switch 910 to switch 912 and then to amplifiers 914 and 916. After the amplifiers, the received signal passes through switch 918 followed by switch 920. After leaving the switch and amplifier network, the received signal fills up a 13 ns delay line 922, which, preferably, is a coaxial cable. Connected to delay line 922 is a complex impedance modulator 924 which modulates the radar signal by varying the reflection coefficient at the end of the cable at a rate of 427,323 Hz. Preferably, modulator 924 is a PIN diode which is turned off and on (modulated open and closed) causing the phase of the received RF signal to be alternately shifted between 0° and 180°. Modulator 924 receives a modulation signal of 427,323 Hz from repeater and timing and control circuit 926. Control circuit 926 also controls switches 910, 912, 918 and 920. Connected to control circuit 926 is crystal 928 for creating a clock signal oscillating at 26.494 MHz.

The modulation performed by repeater 904 is biphase shift key modulation (BPSK), which creates two signals which have frequencies that vary from the incident signal by the modulation rate. The first signal has the same basic shape and amplitude as the incident signal, but with a frequency equal to the sum of the frequency of the incident signal and the modulation rate. In the preferred radar puck, the modulation rate is 427,323 Hz. The second signal has the same basic shape and amplitude as the incident signal, but with a frequency equal to the difference between the frequency of the incident signal and the modulation rate.

In the receive portion of the cycle, the switches are as drawn in FIG. 24. When delay line 922 is full, the repeater switches to transmit mode where control 926 reverses switches 910, 912, 918 and 920, and the signal flows out of the delay line, through switch 920 to switch 912, through amplifier 914 followed by amplifier 916, through switch 918 to switch 910 and finally to antenna 908. Repeater 904 switches between receive and transmit at a rate of 26.494 MHz. One reason for the 13 ns delay in line 922 is to allow time to change the four switches.

The circuit of FIG. 24 has a shock activated switch and timer 930 which includes an RC decay timer which turns off the repeater after 45 seconds and a shock sensor which is used to turn on the circuit. Repeater 904 could have many (e.g. twenty) permanently programmed unique modulation channels. Thus, different pucks can modulate at different rates using control circuitry in timing and control circuit 926. Alternatively, an RF signal could be sent to the puck to indicate which modulation rate to use. Thus, the base radar unit could determine the signature of each puck. Either way, a puck could be readily identifiable and differentiated from other pucks and other sources of RF transmission.

In theory, a radar base unit sends out a signal which is received by the repeater inside the puck. The repeater amplifies, modulates and retransmits the signal back to the radar base unit. The radar base unit uses a difference in frequency to determine how far the puck is from the unit. The location of the puck in three dimensional space can be determined by using three radar base units simultaneously because the location of the puck can be determined from knowing how far it is from three known points. Alternatively, a radar base unit can use other data related to time of travel of the signal to determine distance.

One method for using puck 900 is for the radar base unit to send out a frequency swept signal called a chirp which may, for example, be a sine wave with a constant amplitude and a frequency which is incrementally stepped over a given period of time. Preferably, a low power S-band radar is used to send signals to the puck in the microwave range. When the radar base unit receives the signal which has been sent by the puck, the radar base unit determines the difference between the frequency of the signal received from the puck and the frequency of the signal currently being sent as part of the chirp. The difference in frequencies can be used by techniques known in the art to determine the distance of the puck from the radar base unit.

Repeater 904 has the added feature that it modulates the radar signal, as described above, to create two signals which have frequencies that vary from the incident signal by the modulation rate. The modulated signal from the puck, when received by the radar base unit, would have the same frequency as a signal from an object much further than where the puck actually is. That is, a radar base unit would determine that the puck was at a phantom site five to ten times further than the actual location of the puck (e.g. that the puck was outside the arena). Since other objects actually at the phantom site would not be able to reflect a strong signal back to the radar base unit, the puck would stand out as the object giving the strongest return near the phantom location. A radar base unit could filter out signals received from objects not at the phantom location (e.g. most objects in the arena), allowing the puck to be located with minimal interference from any unwanted clutter.

Figure 25:
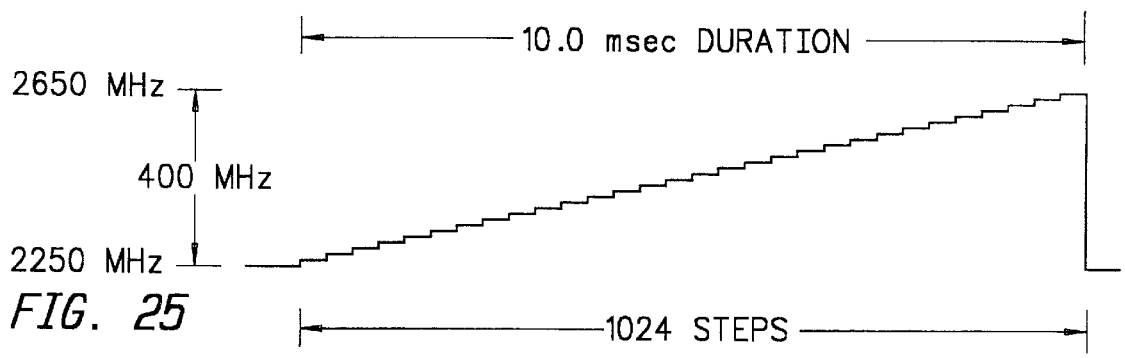
FIGS. 25–27 describe a waveform used in conjunction with the hockey puck of FIG. 22.
Figure 26:
Figure 27:
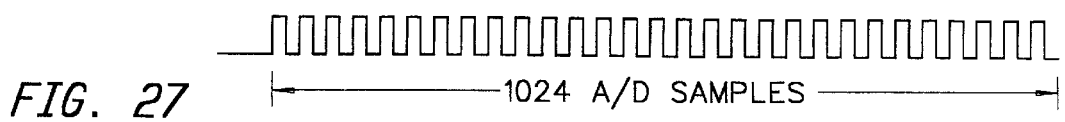

FIGS. 25, 26 and 27 describe an exemplar radar waveform that can be used with puck 900. The chirp, shown in FIG. 25, includes 1024 steps from 2.25 GHz to 2.65 GHz with a ten millisecond period. As described above, the radar base unit alternates between transmit and receive mode during the chirp. FIG. 26 shows the gating cycle between transmit and receive for the radar base unit which indicates that the radar base unit switches between transmit and receive modes at eight times the frequency stepping rate (819,200 Hz). As shown by FIG. 27, 1024 12-bit in-phase and quadrature sample pairs are taken for each 10 msec chirp.

B. Radar System

Many systems can be designed to utilize the advantages of puck 900. One exemplar radar base unit, shown in FIG. 28, uses a homodyne conversion architecture with a gated Frequency Modulated Continuous Wave (FMCW) format. Waveform gating allows the use of a single antenna while the FMCW format allows maximal RF efficiency with minimal information bandwidth. The radar operates with a peak power of one watt, a center frequency of 2.45 GHz, and a FMCW bandwidth of 400 MHz.

Figure 28:
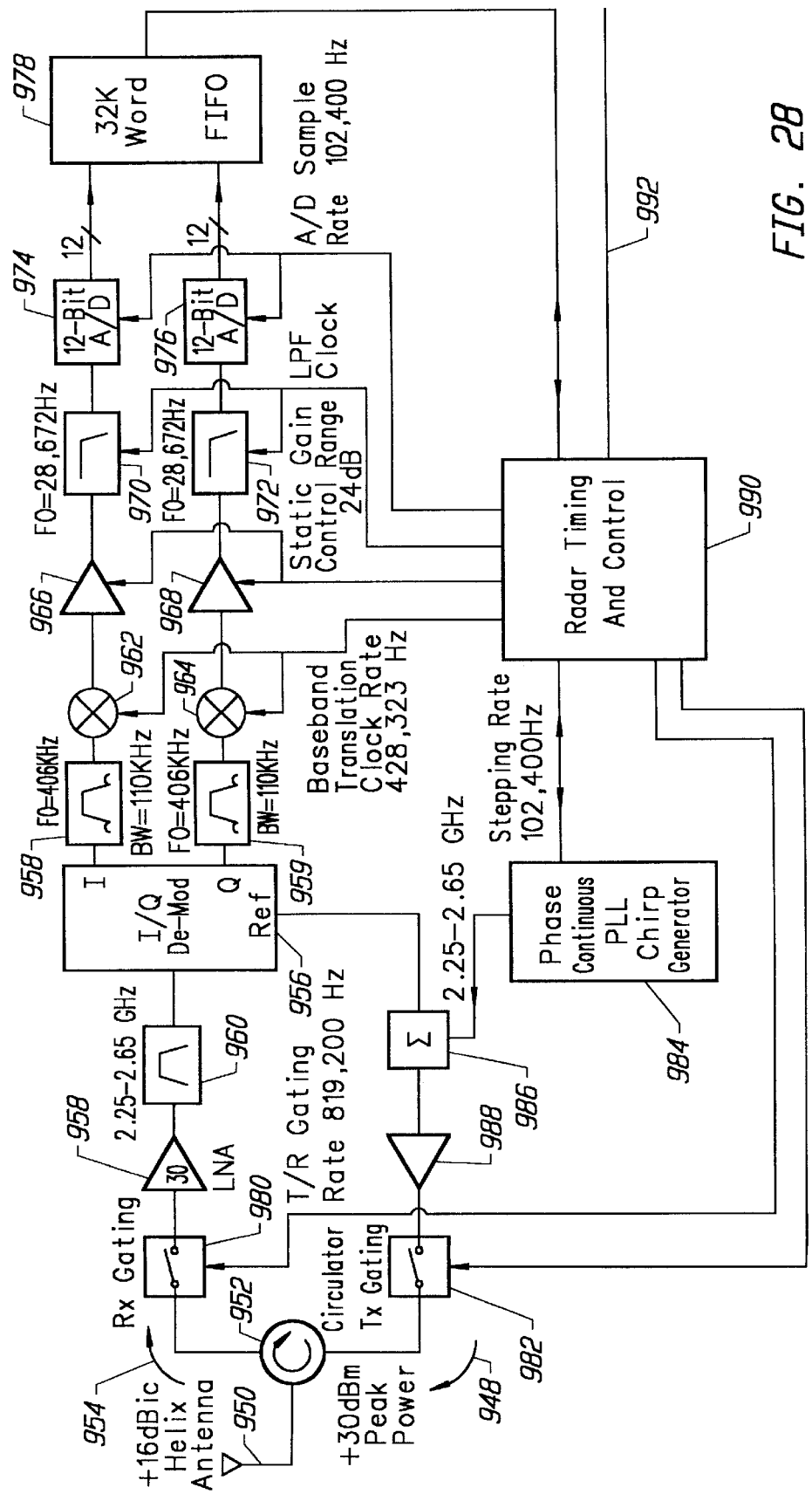
FIG. 28 is a block diagram of an exemplar radar base unit which can be used in conjunction with the hockey puck of FIG. 22.

The radar base unit of FIG. 28 includes two signal paths: a transmit path 948 and a receive path 954. Gates 980 and 982 are used to open and close the transmission and reception paths which alternate, as discussed above with respect to FIG. 26. The transmit path will be discussed first. Under the control of radar timing and control circuit 990, a phase continuous phase locked loop chirp generator 984 creates the output waveform and counts in increments of frequency in 1024 steps from 2.25 GHz to 2.65 GHz. The waveform is sent to splitter 986 where substantially identical signals are sent to demodulator 956 (which is part of the receive path) and to amplifier 988 which amplifies the signal to one watt. After amplifier 988, the signal is applied to the +16 dBic helical radar antenna 950 through circulator 952.

A signal is received by antenna 950 and is passed through circulator 952 into a low noise preamplifier 958. The signal is then passed through filter 960 to remove unwanted energies, for example, cellular phone and satellite signals. The filtered signal is transmitted to demodulator 956, which creates in-phase (I) and quadrature (Q) outputs, both of which are filtered (958 and 960) to remove unwanted noise. The two signals are then sent to multipliers 962 and 964 which perform base band translation, at a clock rate of 428,323 Hz. The two signals are then transmitted to amplifiers 966 and 968, and sent through filters 970 and 972. The filtered signals are converted to digital signals in A/D converters 974 and 976, and stored in FIFO 978 before being transmitted to a computer (not shown) via line 992 for processing.

The computer triggers the radar base unit to transmit one chirp via communication with control 990 over line 992. After the chirp, the I/Q samples are read from the radar base unit and processed to extract the puck signal and then calculate its distance using techniques known in the art. In actual operation this process would happen at the video field rate of 60 Hz. Although the described radar repeater and radar base unit use a specific modulation scheme, the exact modulation scheme used is not critical to the inventive concept and many other suitable modulation schemes may be substituted.

The above described radar base unit is able to determine the distance from the base unit to the puck. Thus, a sphere can be drawn with the center of the sphere being the base unit and the radius of the sphere being the distance from the base unit to the puck. The puck's three-dimensional location can be determined using three base units. If spheres are drawn for each base unit, the three spheres will intersect at two points. One of these points is in the field of play and represents the three-dimensional position of the puck. The second point is an unrealistic location and is discarded. Once the puck's location is determined, a system can enhance the presentation of the puck in a manner similar to that described in FIGS. 15–21.

The active radar system discussed above can be used with other objects in sporting events. For example, the radar repeater can be placed inside helmets, in various balls, in race cars, bicycles, etc.

C. Alternatives

Figure 29:
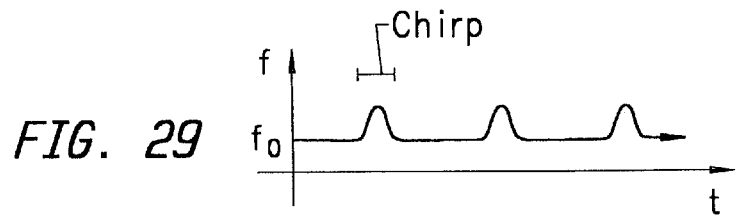
FIG. 29 depicts an exemplar waveform for a RF transmitting object.

One alternative utilizes a puck or other objects which includes an RF transmitter rather than a radar repeater; for example, a chirping puck. The chirping puck would send out a signal which includes periodic chirps. FIG. 29 is an example waveform with the Y axis representing frequency and the X axis representing time. A majority of time, the chirping puck is transmitting a signal with a frequency of $f_0$. Every period, the puck transmits a chirp which includes a signal whose frequency first increases from $f_0$ to a maximum frequency and then decreases back to $f_0$. The signal sent by the puck is received by a radar receiver which can determine relative distance. That is, two radar receivers can determine that one of the radar receivers is M meters closer to the puck than the other radar receiver. Four radar receivers are needed to determine the puck's three-dimensional location. The technology to utilize the chirping puck and accompanying radar receivers can be derived from the above discussed radar technology and from other technology known in the art. One alternative includes having multiple objects having RF transmitters, each transmitter sending a unique signal. Thus, a system can track more than one object and differentiate between the objects being tracked. Thus, when enhancing the television presentation each object separately being tracked can be enhanced distinctly.

Another alternative includes an object with an RF transmitter and a receiver. A base unit sends a signal to the object indicating when the object should transmit. The base unit can turn on one specific object at a unique frequency so that objects not in use will not transmit any signals and the base unit can determine which object the signal is coming from. Thus, objects can be enhanced distinctly.

III. Radar with a Passive Reflecting Target

Another embodiment of the present invention includes using the graphics enhancement system of the present invention with a radar base unit and a passive reflecting target. Similar to the radar with active transponder, three or more radar base units are needed to determine the three dimensional location of the object. A radar base unit sends a radar signal to the object which reflects the signal back to the base unit. The object being tracked does not include an active transponder (e.g. an unmodified baseball). Rather, the unmodified object itself passively reflects the radar signal or the object is modified to include a reflective element. One example of modifying an object includes adding a metal object or sputtering a film of metal throughout a surface. Another option includes adding a retro-reflector in the object. A retro-reflector returns energy directly back to the transmitter. One example of a retro-reflector is a trihedral, which is also known as a corner reflector. To use passive radar technology with the present invention, those skilled in the art could modify the system of FIG. 28 or use other systems known in the art. For example, U.S. Pat. No. 5,150,895 discloses a method of and a system for determining the position of a ball relative to a playing field using a signal reflecting off of a passive radar reflecting element.

Figure 30:
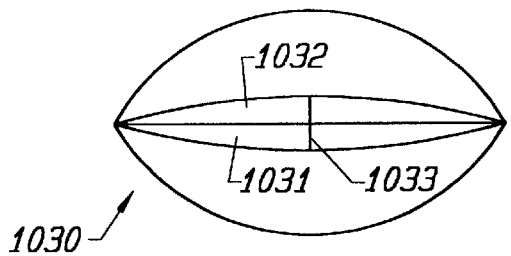
FIG. 30 depicts a football used in a radar system.

FIG. 30 shows an outline of football 1030. Inside football 1030 is a corner reflector which includes three walls 1031, 1032 and 1033. All three walls are perpendicular to each other. The corner reflector is made from metalized mylar or another suitable metal. Metalized mylar is particularly useful because it is lightweight and an excellent radar reflector.

Figure 31:
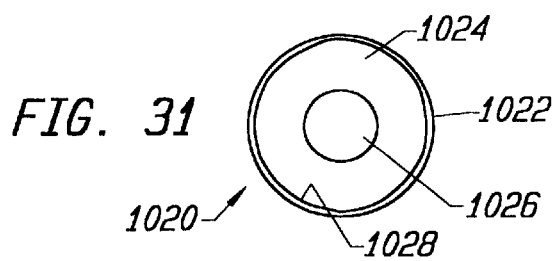
FIG. 31 is a cross-sectional view of a golf ball used in a radar system.

FIG. 31 shows golf ball 1020 with core 1026. Surrounding core 1026 is one or more wrapped rubber strands 1024. Encasing the rubber strands is shell 1022. Sputtered to the inside surface of shell 1022 are aluminum filings 1028 which are used as radar signal reflecting elements. Alternatives to the aluminum figs could be aluminum paint or any other good radar repeater. Additionally, the radar signal reflecting element can be dispersed within the wrapped rubber strand rather than attached to the inside of shell 1022. Golf ball 1020 could also be used with a Doppler radar system.

Figure 32:
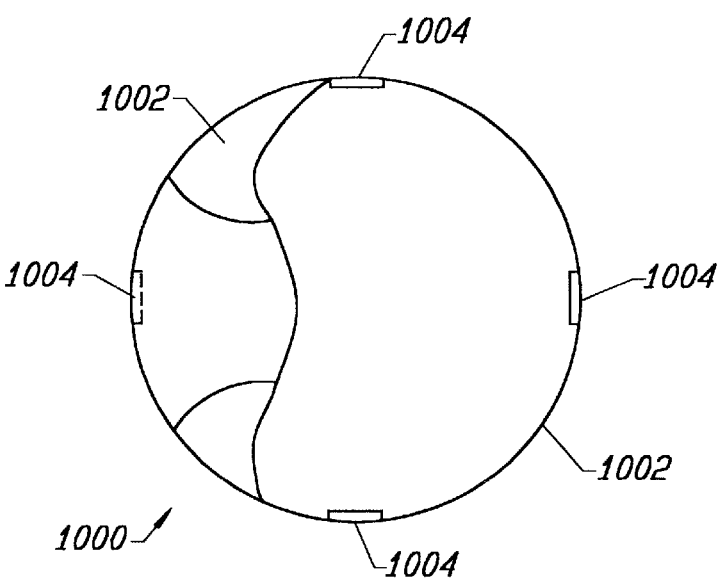
FIG. 32 is a cut-away view of a tennis ball used in a radar system.

FIG. 32 shows a tennis ball which includes radar signal reflecting elements. Tennis ball 1000 includes an outer ball body 1002 which is partially cut away to show radar signal reflecting elements 1004. In one embodiment the radar reflective elements are metallic or metalized plastic foils that are attached to the inside surface of outer ball body 1002. Alternatively, tennis ball 1000 can be constructed to include a plurality of metallic particles embedded in outer ball body 1002. The radar system can be used to track other objects including soccer balls, helmets, bicycles, cars, etc.

IV. Optical Recognition

Another embodiment contemplates using a sensor employing optical recognition or pattern recognition. Such a system is uses video frames from cameras and relies on properly positioning the cameras. For example, for baseball a camera should be located behind the catcher, down the base paths, overlooking the infield and overlooking the outfield. In golf, cameras should be near the tee, in sight of the fairway and in proximity to the hole. The system operates best when the cameras are positioned such that the object to be tracked is always in the field of view of at least one or two cameras. Finding objects using optical or pattern recognition is known in the art. Examples of systems known in the art include U.S. Pat. No. 4,924,507, Real-Time Optical Multiple Object Recognition and Tracking System and Method; U.S. Pat. No. 4,950,050, Optical Target Recognition System; U.S. Pat. No. 5,060,282, Optical Pattern Recognition Architecture Implementing the Mean-Square Error Correlation Algorithm; U.S. Pat. No. 5,241,616, Optical Pattern Recognition System Utilizing Resonator Array; U.S. Pat. No. 5,274,716, Optical Pattern Recognition Apparatus; and *Digital Image Processing and Computer Vision,* Robert J. Schalkoff, John Wiley & Sons, Inc. (1989), all of which are incorporated by reference. An optical recognition system that determines the three dimensional location of an object can be used by a graphics center and production center in a manner similar to that described above to enhance a television presentation of the object.

V. Additional Graphical Enhancements

Additional enhancements particular to a system for enhancing a baseball game include graphically exaggerating a curve in the trajectory of a curve ball, providing statistics about a pitch, simulating the batter's point of view, graphically comparing a curve ball to a fast ball and other enhancements related to the location and movement of the ball.

The current invention can also be used to enhance live broadcast video based on past events. For example, ski races allow one racer to ski at a time. During television broadcast of ski competitions, television broadcasters divide the race course into four or five check points. When the racer crosses a particular check point, the broadcaster compares the current skier's time to the time of a previous skier. Using the current invention, the location of a first skier can be tracked (with timing information) along with the pan, tilt, zoom and location of various broadcast cameras. A video processor stores the data in memory. When a second skier races, the video processor uses the stored information about the first racer and the location, pan, tilt, and zoom of the broadcast camera viewing the second skier to create a graphic of the first skier. The graphic of the first skier would be overlaid or edited into the video frame with the second skier at the location where the first skier was at the particular relative time of the broadcast. Thus, during the race viewers would be able to see the second skier race against the first skier (phantom skier or phantom object). Similar enhancements can be made with different race events or other types of sporting competitions.

Another enhancement that can be accomplished using the disclosed system is future path display. Video processor 604 can determine the object's trajectory using techniques well known in the art and predict the path of the object. The predicted path can be displayed in the video frame. In one embodiment, a target can appear at the end of the predicted path, for example, a baseball glove. In one alternative, a system performing look ahead processing can delay the video data a given number of frames, thereby, allowing video processor 604 to verify the predicted path for the next given number of frames.

The present invention can be used with many different sporting events. The foregoing detailed description of the invention has been presented for purposes of illustration and description. It is not intended to be exhaustive or to limit the invention to the precise form disclosed, and obviously many modifications and variations are possible in light of the above teaching. The described embodiments of the system for enhancing the television presentation of an object at a sporting event were chosen in order to best explain the principles of the invention and its practical application to thereby enable others skilled in the art to best utilize the invention in various embodiments and with various modifications as are suited to the particular use contemplated. For example, the inventors contemplate that the present invention can be used with many different suitable sensors and graphics processing systems. It is intended that the scope of the invention be defined by the claims appended hereto.

What is claimed is:

1. A method for enhancing a video, comprising the steps of:
    receiving video during an event, said video including an image of a target area, said target area being at a first position in said video;
    receiving field of view data from one or more sensors that do not use image recognition;
    determining said first position in said video using said field of view data during said event;
    inserting nonvideo data into said video during said event, said nonvideo data indicates said first position in said video;
    transmitting said video, with said nonvideo data, to a remote location during said event receiving said video at said remote location;
    reading said nonvideo data at said remote location;
    receiving an indication from a user interface indicating whether to enhance or not to enhance; and
    enhancing said video based on said first position if said indication from said user interface indicates to enhance said step of enhancing being performed at said remote location during said event said remote location is not a television studio.

2. A method according to claim 1, further including the step of determining a three dimensional location of a target corresponding to said target area, said step of determining said first position uses said three dimensional location to determine said first position in said video.

3. A method according to claim 2, wherein:
    said step of determining a three dimensional location of a target includes determining a three dimensional location of a moving object at said event.

4. A method according to claim 1, wherein:
    said video includes a plurality of frames of video;
    said event is a live sporting event;
    said first position corresponds to a first frame of said plurality of frames of video; and
    said step of inserting nonvideo data into said video includes inserting said nonvideo data into a vertical blanking interval portion of said video.

5. A method according to claim 1, wherein:
    said step of inserting nonvideo data into said video includes inserting said nonvideo data into a vertical blanking interval portion of a television signal.

6. A method according to claim 1, wherein:
    said step of enhancing includes adding an image to said video at said first position.

7. A method for enhancing a live television presentation of an event, comprising the steps of:
    receiving a live broadcast television signal at a first location other than a television studio, said event being performed at a second location, said first location is remote from said second location, said television signal includes video data and nonvideo data, said video data includes images of said event, said images of said event include one or more images of a target area, said nonvideo data includes data indicating a position of said target area in at least one of said images of said event;
    receiving an indication from a viewer to enhance said television signal;
    reading said nonvideo data during said event; and
    enhancing said at least one of said images of said event based on said position of said target area, said step of enhancing being performed at said first location during said event, said step of enhancing being performed in response to said indication from said viewer.

8. A method according to claim 7, wherein:
    said step of enhancing includes adding an additional image to said at least one of said images, said additional image is added at said position of said target area.

9. A method according to claim 8, wherein:
    said indication from said viewer indicates a choice of said additional image from a set of two or more enhancements.

10. A method according to claim 7, wherein:
    said data indicating said position is based on field of view data from one or more sensors that do not use pattern recognition.

11. A method according to claim 7, wherein:
    said indication from said viewer indicates a choice of a particular enhancement from a set of two or more enhancements.

12. A method according to claim 7, further comprising the step of:
    displaying said at least one of said images of said event on a computer monitor after said step of enhancing.

13. A method according to claim 7, further comprising the step of:
    displaying said at least one of said images of said event on a television after said step of enhancing.

14. A method according to claim 7, wherein:
    said live broadcast television signal includes a vertical blanking interval portion; and
    said data indicating a position of said target area is stored in said vertical blanking interval portion.

15. A method for enhancing a video of a sporting event, comprising the steps of:
    receiving video during said sporting event, said video including an image of a target area, said target area being at a first position in said video;
    determining said first position in said video during said sporting event;
    inserting nonvideo data into said video during said sporting event, said nonvideo data indicates said first position in said video;
    broadcasting said video to viewers during said sporting event;

receiving said broadcasted video at a viewer location other than a television studio, said step of determining being performed at a location remote from said viewer location;

reading said nonvideo data from said video, said step of reading includes reading said data indicating said first position;

receiving an indication from a user interface to enhance said video; and in response to said step of receiving an indication, enhancing said video based on said first position, said step of enhancing being performed during said event at said viewer location.

16. A method according to claim 15, further including the step of:

receiving field of view data from one or more sensors that do not use image recognition, said step of determining said first position in said video uses said field of view data.

17. An apparatus for enhancing a live television presentation of an event, comprising:

means for receiving a broadcast television signal at a first location other than a television studio, said event being performed at a second location, said first location is remote from said second location, said television signal includes video data and nonvideo data, said video data includes images of said event, said images of said event include one or more images of a target area, said nonvideo data includes data indicating a position of said target area in at least one of said images of said event;

means for receiving an indication from a viewer to enhance said television signal;

means for reading said nonvideo data during said event; and means, in response to said indication from said viewer, for enhancing said at least one of said images of said event based on said position of said target area, said enhancing being performed at said first location during said event.

18. An apparatus according to claim 17, wherein:

said indication from said viewer indicates a choice of a particular enhancement from a set of two or more enhancements.

19. An apparatus according to claim 17, wherein:

said means for enhancing adds an additional image to said at least one of said images at said position of said target area.

20. An apparatus for enhancing a live television presentation of an event, comprising:

a decoder, said decoder receives a television signal at a first location other than a television studio, said event being performed at a second location, said first location is remote from said second location, said television signal includes video data and nonvideo data, said video data includes images of said event, said images of said event include one or more images of a target area, said nonvideo data includes data indicating a position of said target area in at least one of said images of said event, said decoder reads said nonvideo data;

a display;

an input device; and a processor in communication with said decoder, said display and said input device, said processor performs a method comprising the steps of:

receiving said position of said target area, receiving an indication from a viewer to enhance said television signal, and enhancing said at least one of said images of said event based on said position of said target area, said step of enhancing being performed at said first location during said sporting event, said step of enhancing being performed in response to said indication from said viewer.

21. An apparatus according to claim 20, wherein:

said indication from said viewer indicates a choice of a particular enhancement from a set of two or more enhancements.

22. An apparatus according to claim 20, wherein:

said step of enhancing adds an additional image to said at least one of said images at said position of said target area.

23. An apparatus according to claim 20 wherein:

said decoder reads said nonvideo data from a vertical blanking interval portion of said television signal.

* * * * *

UNITED STATES PATENT AND TRADEMARK OFFICE
CERTIFICATE OF CORRECTION

PATENT NO. : 6,154,250
DATED : November 28, 2000
INVENTOR(S) : Honey, et al.

It is certified that error appears in the above-identified patent and that said Letters Patent is hereby corrected as shown below:

Claims,
Column 33,
Line 36, after "event" and before "receiving" insert -- ; --
Line 36, before "receiving" insert a carriage return and tab (to start a new paragraph).

Signed and Sealed this

Thirtieth Day of October, 2001

Attest:

NICHOLAS P. GODICI
Attesting Officer — Acting Director of the United States Patent and Trademark Office